United States Patent
Shinojima et al.

(10) Patent No.: US 8,583,115 B2
(45) Date of Patent: Nov. 12, 2013

(54) COMMUNICATION APPARATUS, BASE STATION, AND COMMUNICATION METHOD

(75) Inventors: Ryota Shinojima, Kawasaki (JP); Hiroyuki Fujii, Kawasaki (JP); Kenichi Nunokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/586,037

(22) Filed: Aug. 15, 2012

(65) Prior Publication Data

US 2012/0309393 A1 Dec. 6, 2012

Related U.S. Application Data

(63) Continuation of application No. PCT/JP2010/054710, filed on Mar. 18, 2010.

(51) Int. Cl.
*H04W 4/00* (2009.01)

(52) U.S. Cl.
USPC ...................................... 455/435.1

(58) Field of Classification Search
USPC .......... 455/41.2, 451, 452.1, 452.2, 500, 507, 455/509, 510, 512, 513, 514, 516, 517, 524, 455/525, 526, 552.1, 435.1, 462, 426.2; 370/328, 329, 341, 401, 402, 331, 338
See application file for complete search history.

(56) References Cited

U.S. PATENT DOCUMENTS

| | | | |
|---|---|---|---|
| 2007/0121539 A1 | 5/2007 | Kikuchi | |
| 2007/0197205 A1 | 8/2007 | Ishikawa | |
| 2008/0310335 A1* | 12/2008 | Wang et al. | 370/310 |
| 2009/0070694 A1* | 3/2009 | Ore et al. | 715/764 |
| 2010/0113032 A1* | 5/2010 | Lee et al. | 455/437 |

FOREIGN PATENT DOCUMENTS

| | | |
|---|---|---|
| JP | 4-180314 | 6/1992 |
| JP | 9-84107 | 3/1997 |
| JP | 10-23503 | 1/1998 |
| JP | 10-32654 | 2/1998 |
| JP | 2004-289723 | 10/2004 |
| JP | 2005/096656 | 10/2005 |
| WO | 2005-039211 | 4/2005 |
| WO | 2005/096656 | 10/2005 |

OTHER PUBLICATIONS

International Search Report dated Jun. 1, 2010, from corresponding International Application No. PCT/JP2010/054710.
International Preliminary Report on Patentability and Written Opinion of the International Searching Authority dated Nov. 1, 2012, from corresponding International Application No. PCT/JP2010/054710.
Japanese Office Action dated Jul. 30, 2013, from the corresponding Japanese Application No. 2012-505400.

(Continued)

*Primary Examiner* — Kiet Doan
(74) *Attorney, Agent, or Firm* — Katten Muchin Rosenman LLP

(57) ABSTRACT

A communication apparatus includes memory that stores registration information that indicates a registered mobile terminal registered in a base station; and a processor configured to perform connection processing of connecting a non-registered mobile terminal to the base station, based on a connection request signal from the non-registered mobile terminal not stored in the memory; measure utilization of the base station by the non-registered mobile terminal for which the connection processing has been performed; and transmit obtained measurement results to another communication apparatus via a communication interface.

14 Claims, 21 Drawing Sheets

(56) References Cited

OTHER PUBLICATIONS

ZTE, HNB Access Mode handling procedure, R3-090760, 3GPP, Mar. 26, 2009.

Samsung, open/hybrid access specifics for Resource allocation, R3-091188, 3GPP, May 8, 2009.

Huawei, Proposition on Open and Hybrid Mode, R3-091089, 3GPP, May 8, 2009.

* cited by examiner

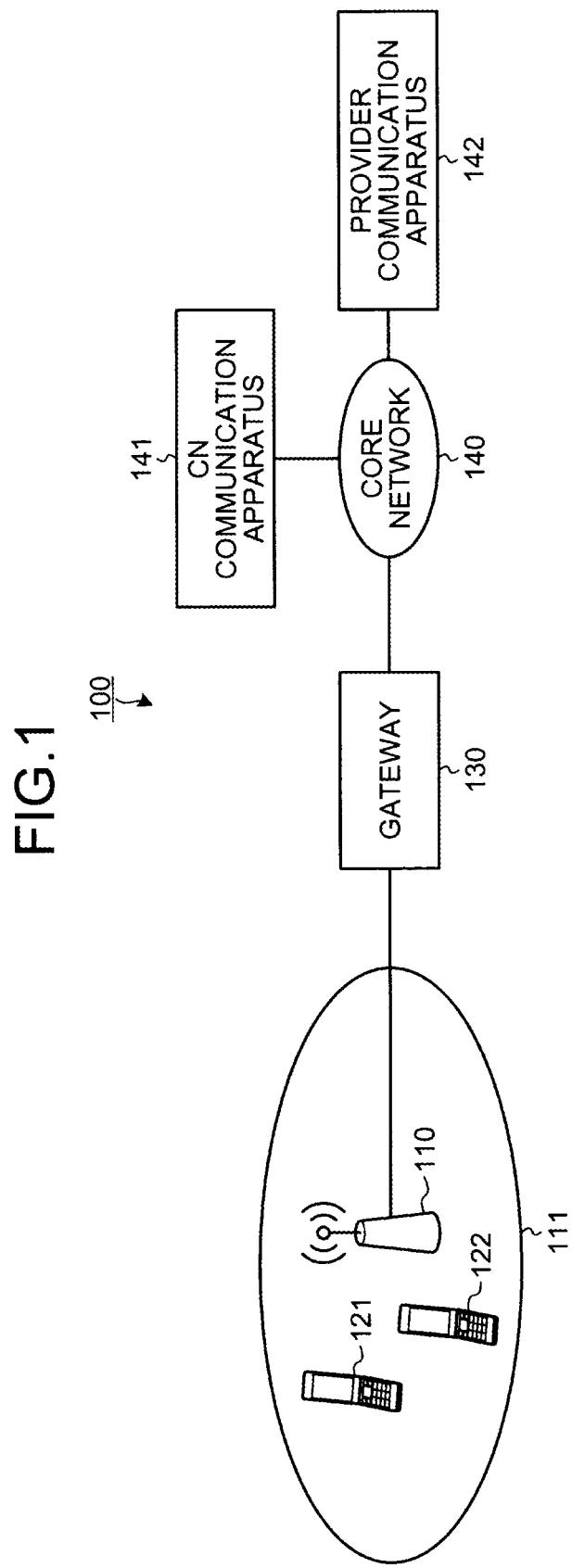

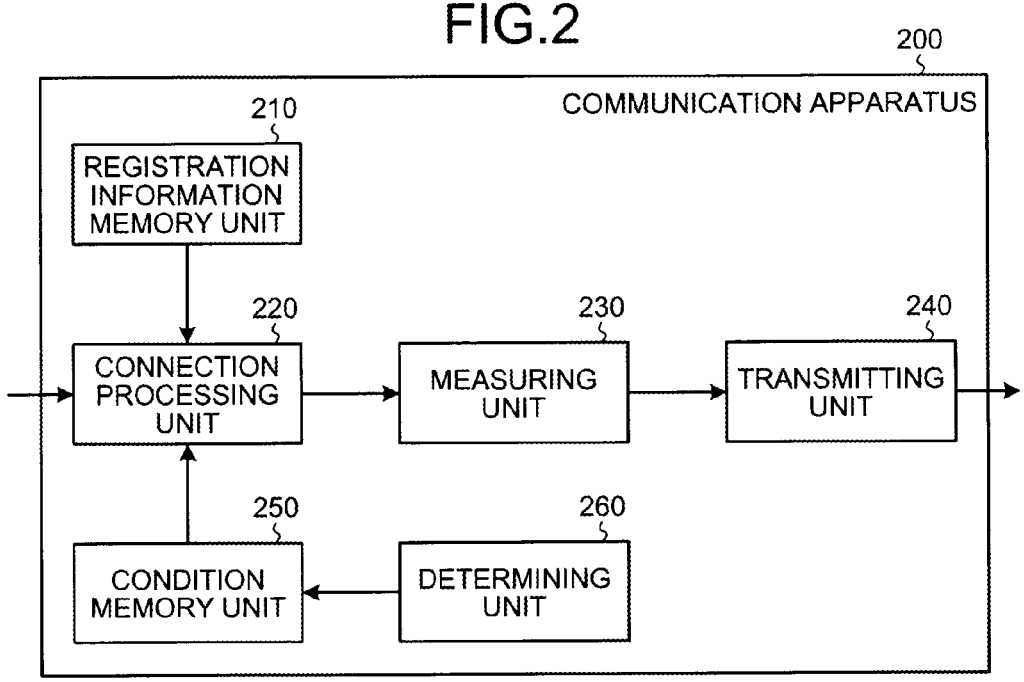

| TIME PERIOD | NUMBER OF PERMITTED CONNECTIONS OF NON-REGISTERED MOBILE TERMINAL |
|---|---|
| 0:00 ~ 9:00 | α-3 |
| 9:00 ~ 15:00 | α-1 |
| 15:00 ~ 18:00 | α-2 |
| 18:00 ~ 24:00 | α-3 |

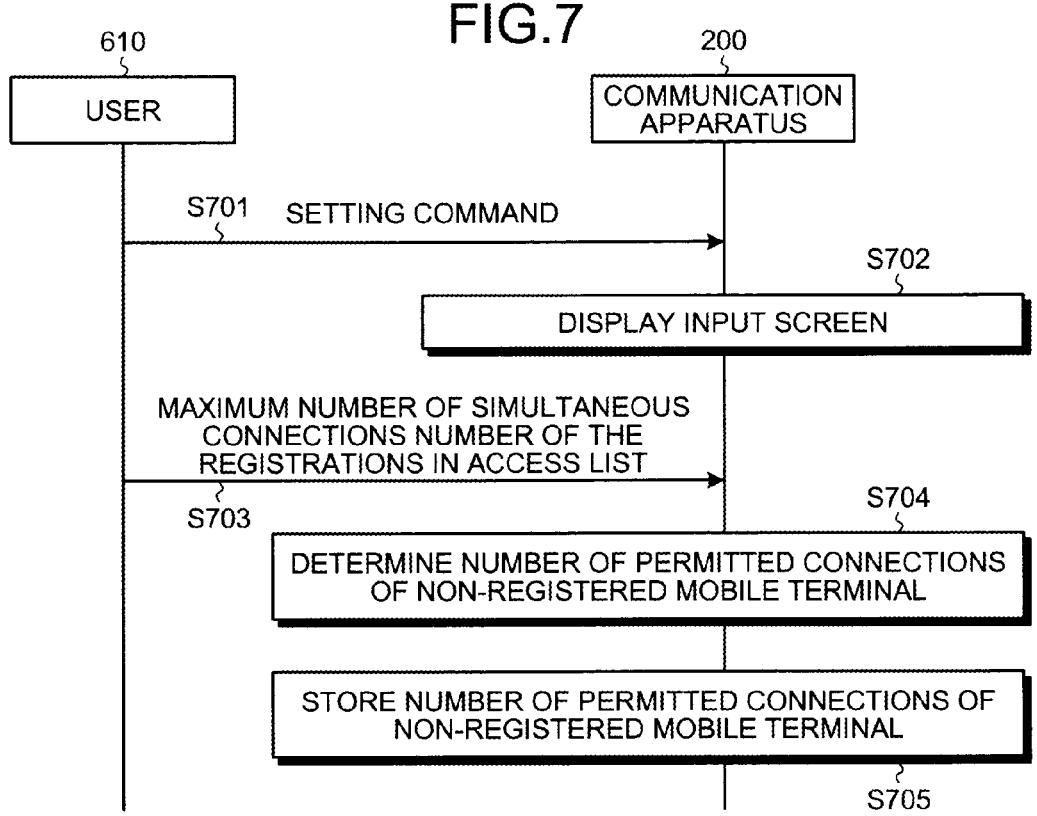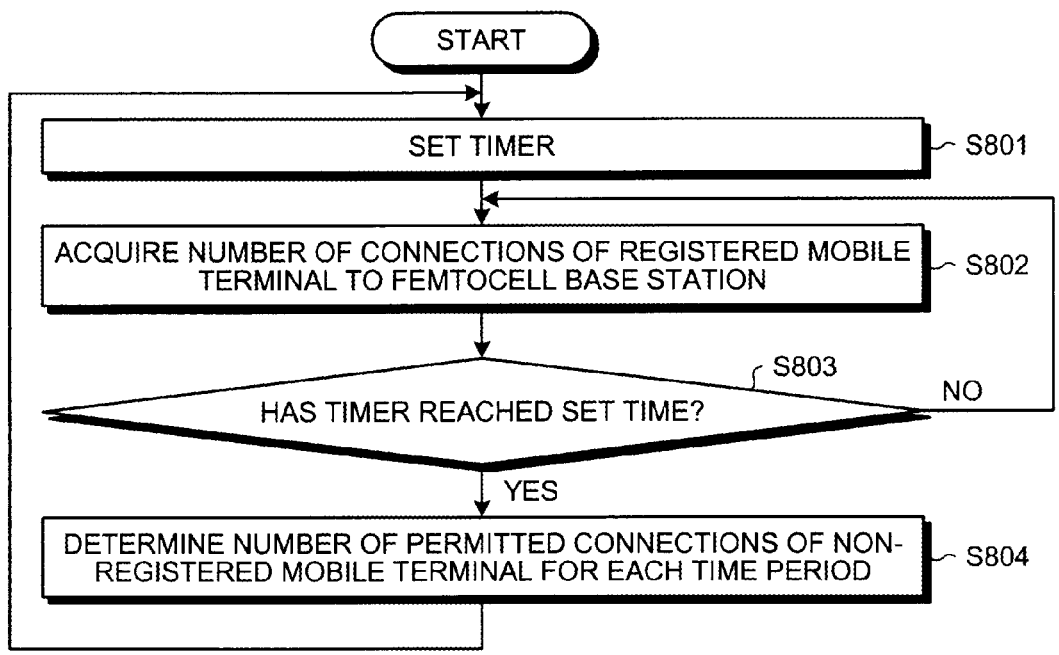

| TIME PERIOD | NUMBER OF PERMITTED CONNECTIONS OF NON-REGISTERED MOBILE TERMINAL |
|---|---|
| 0:00 ~ 9:00 | α-3=1 |
| 9:00 ~ 15:00 | α-1=3 |
| 15:00 ~ 18:00 | α-2=2 |
| 18:00 ~ 24:00 | α-3=1 |

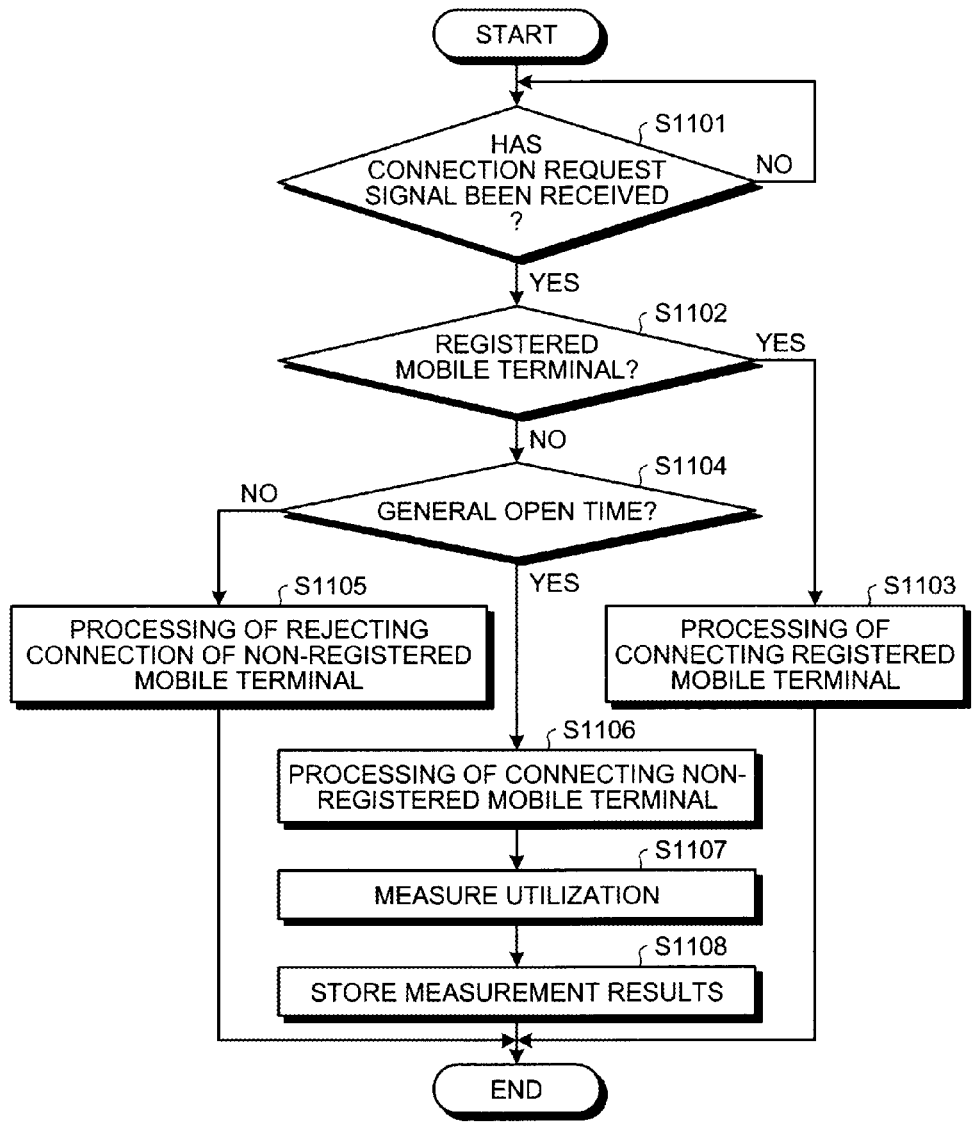

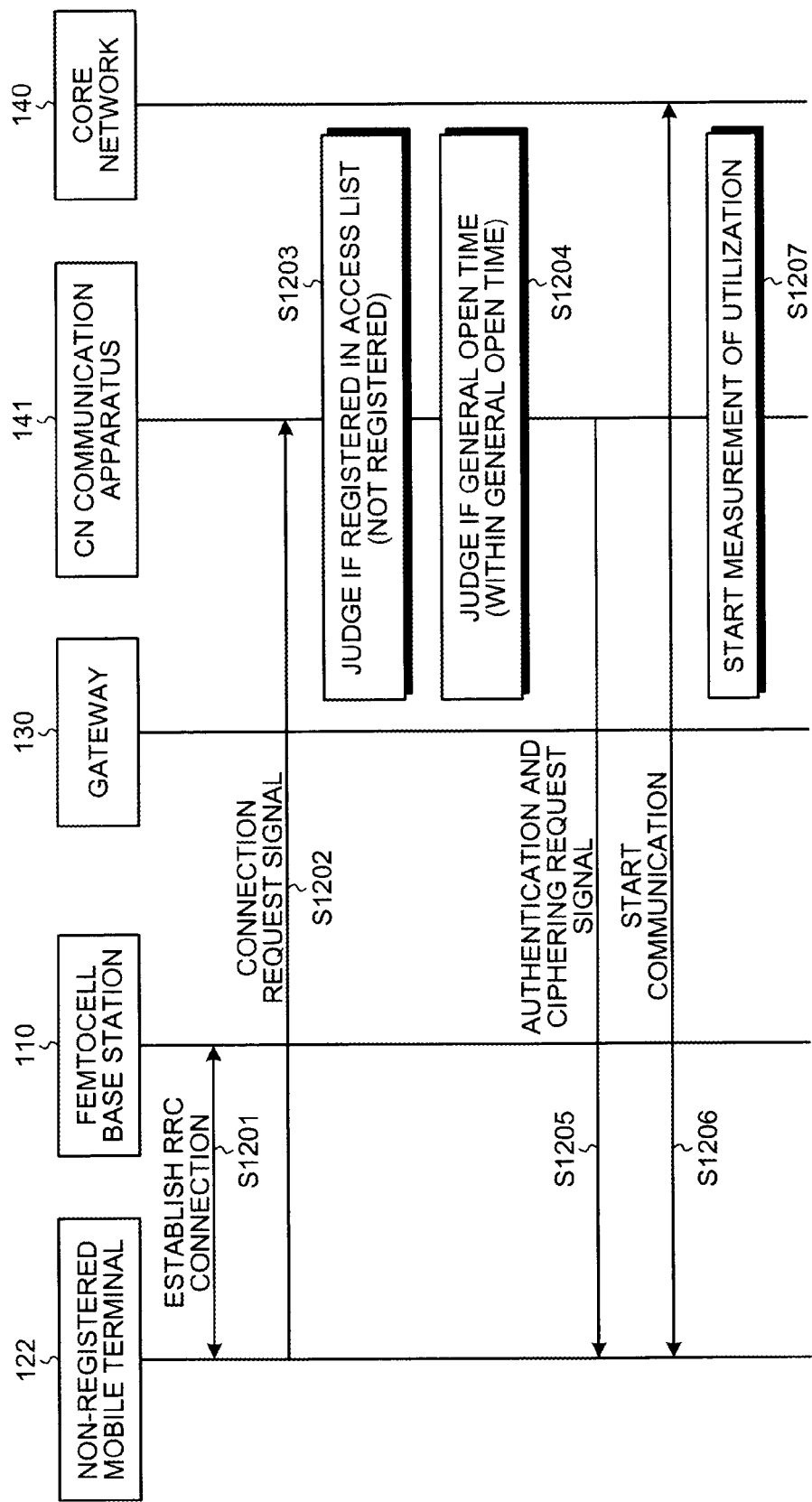

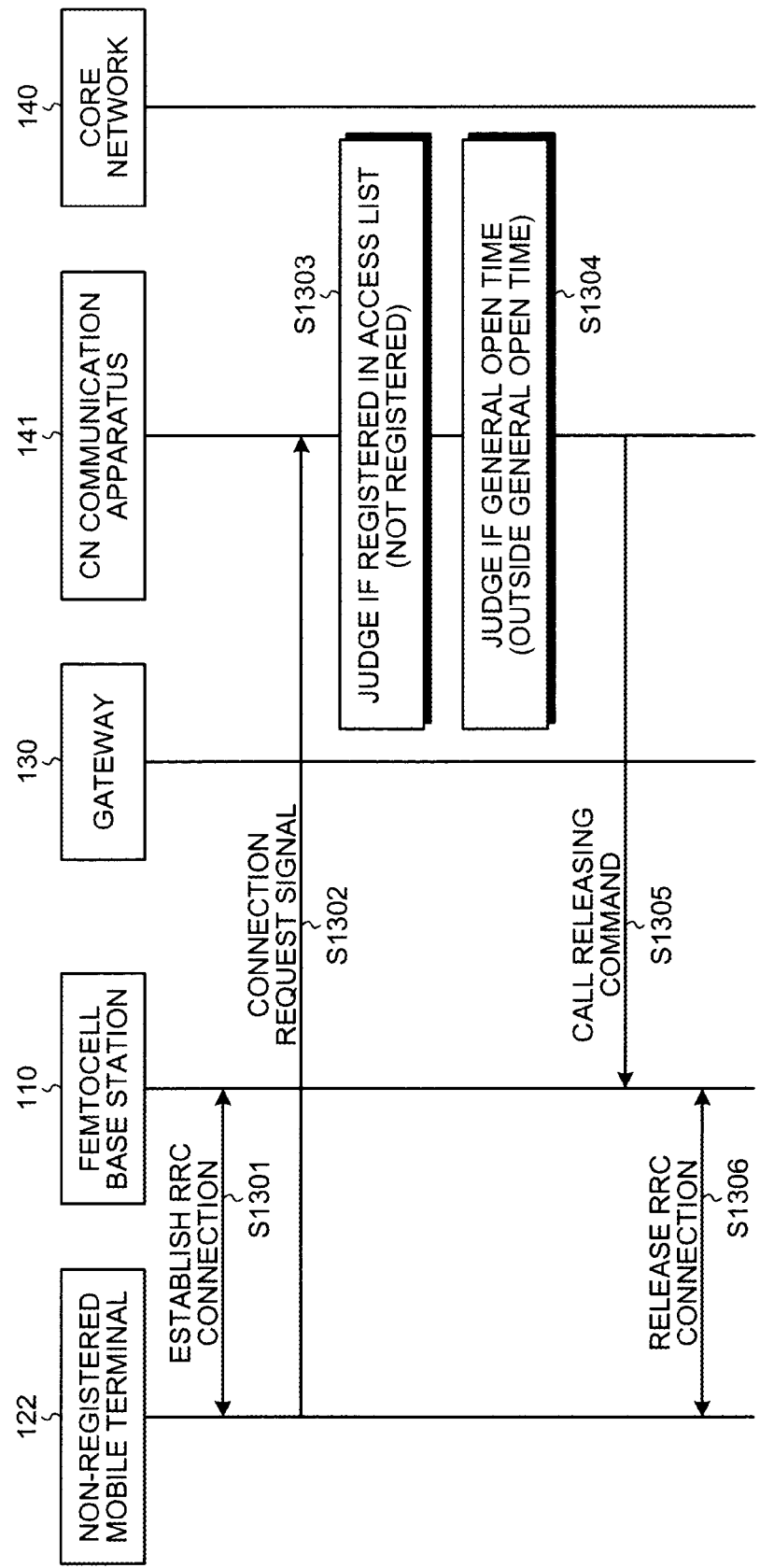

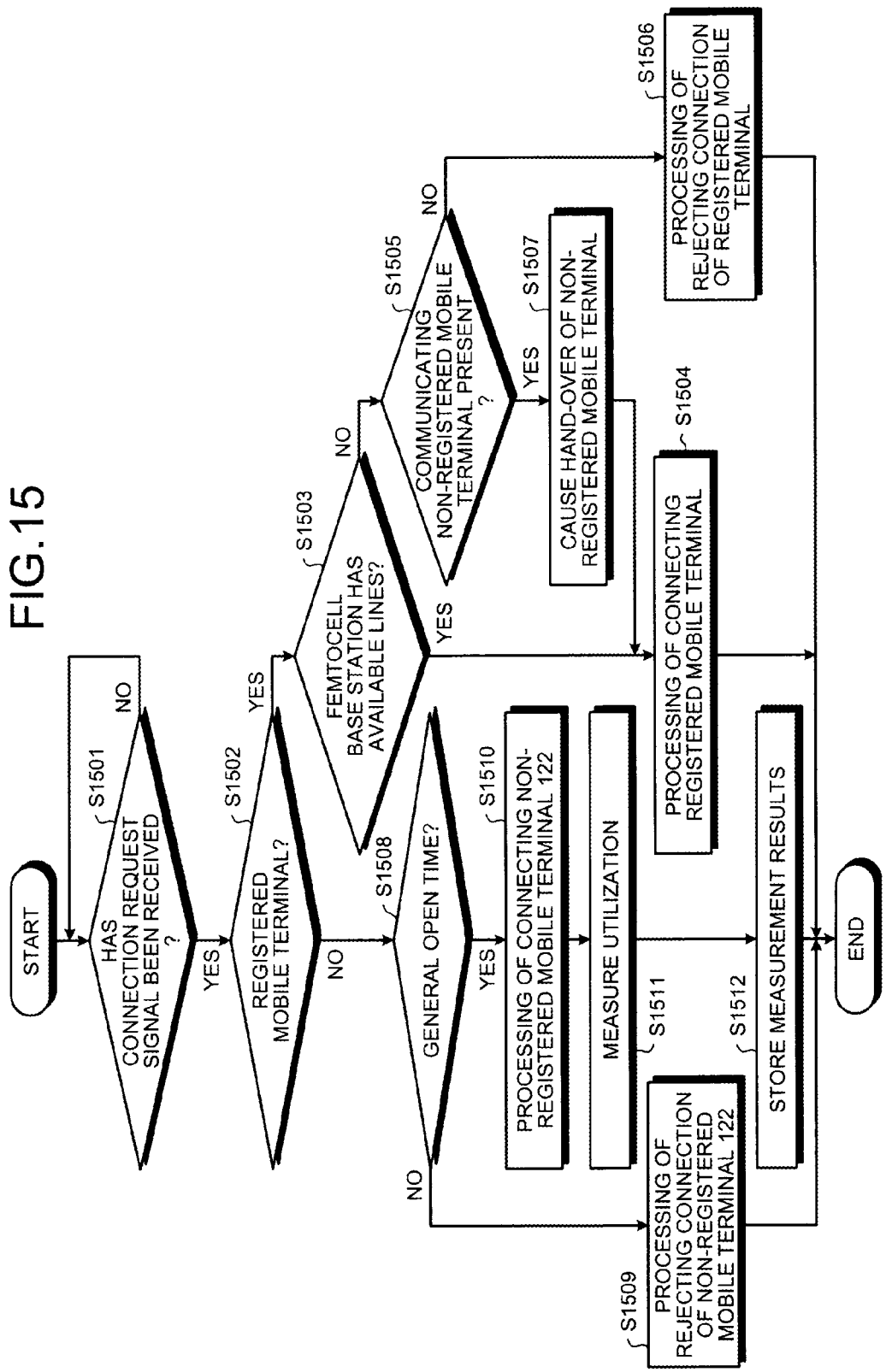

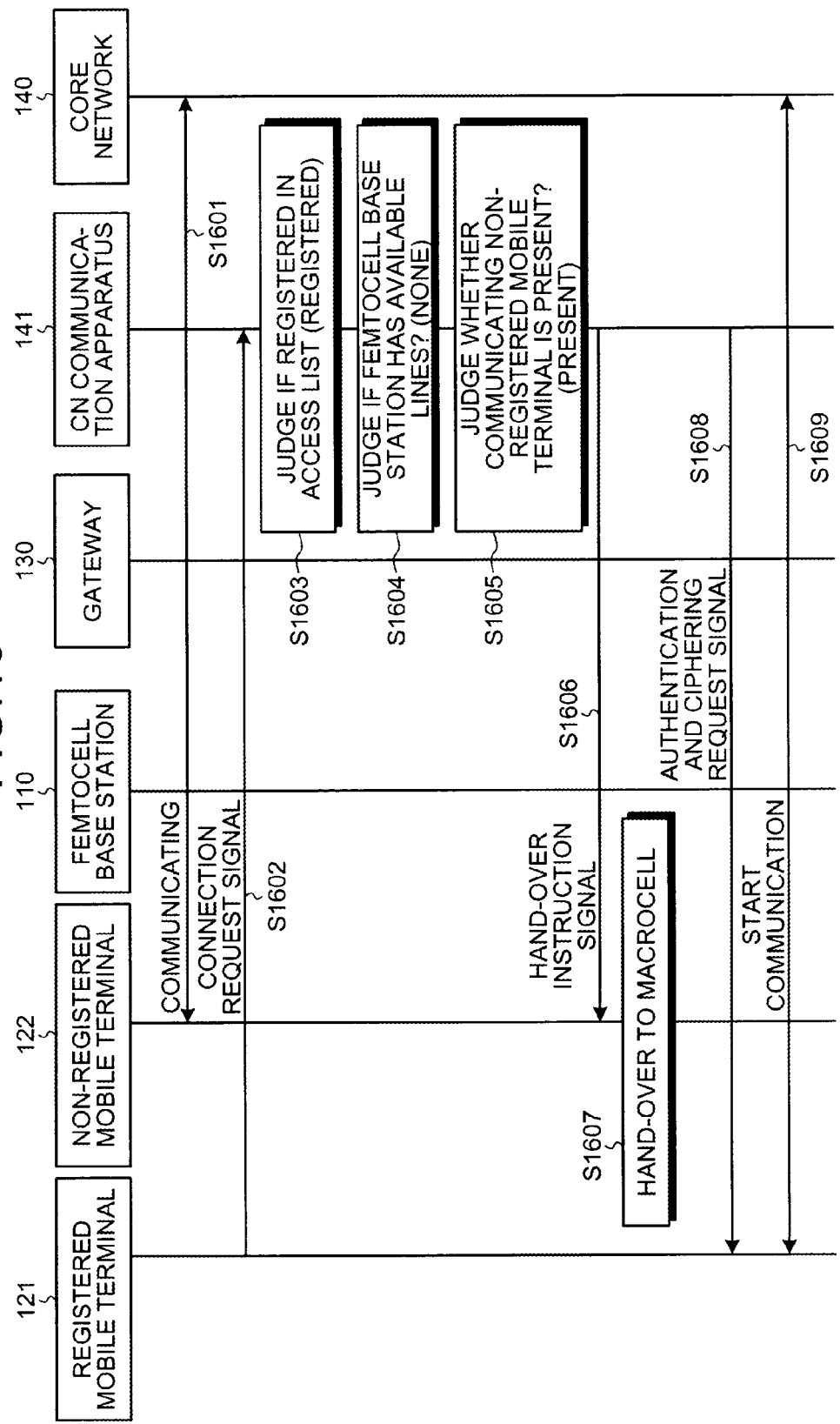

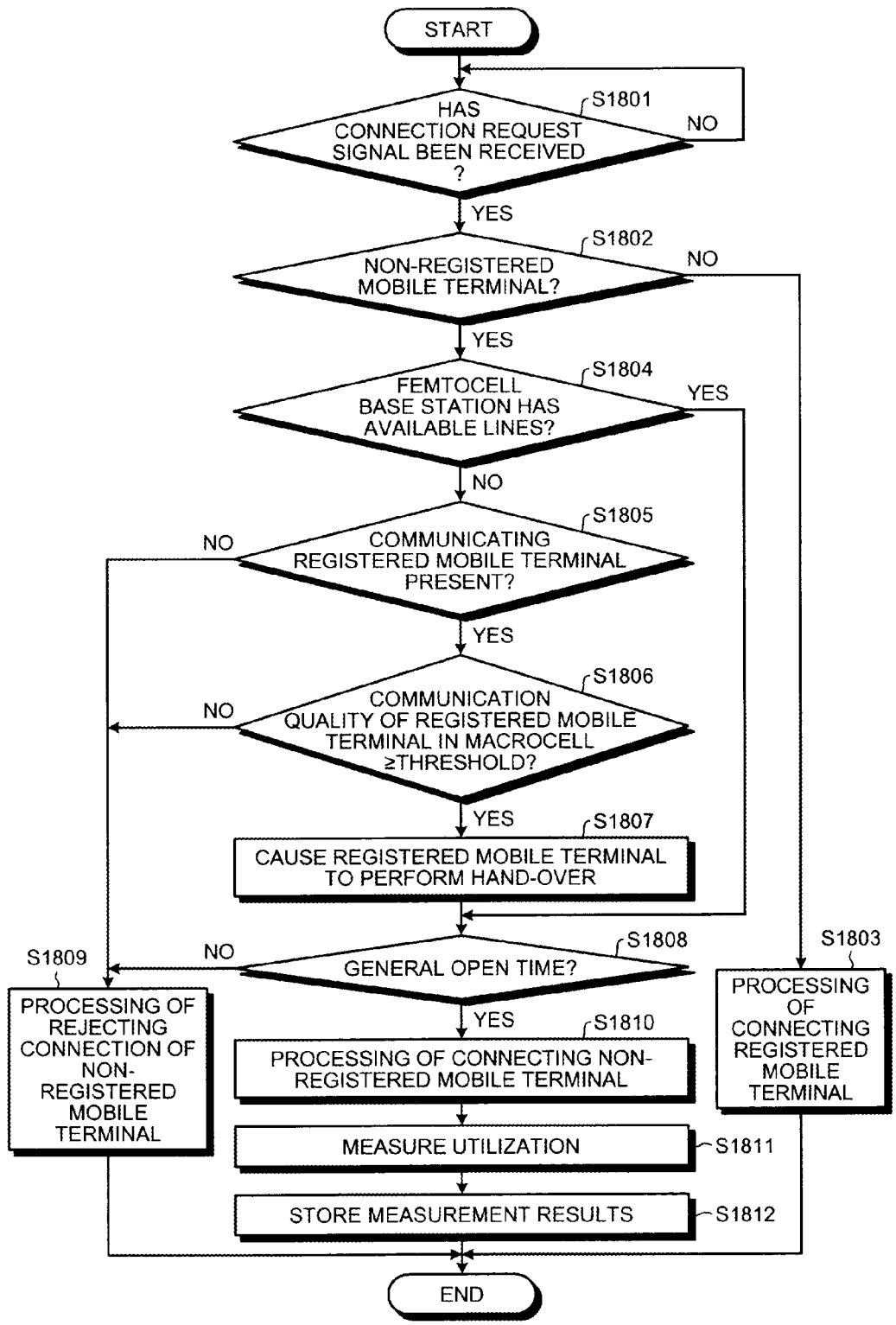

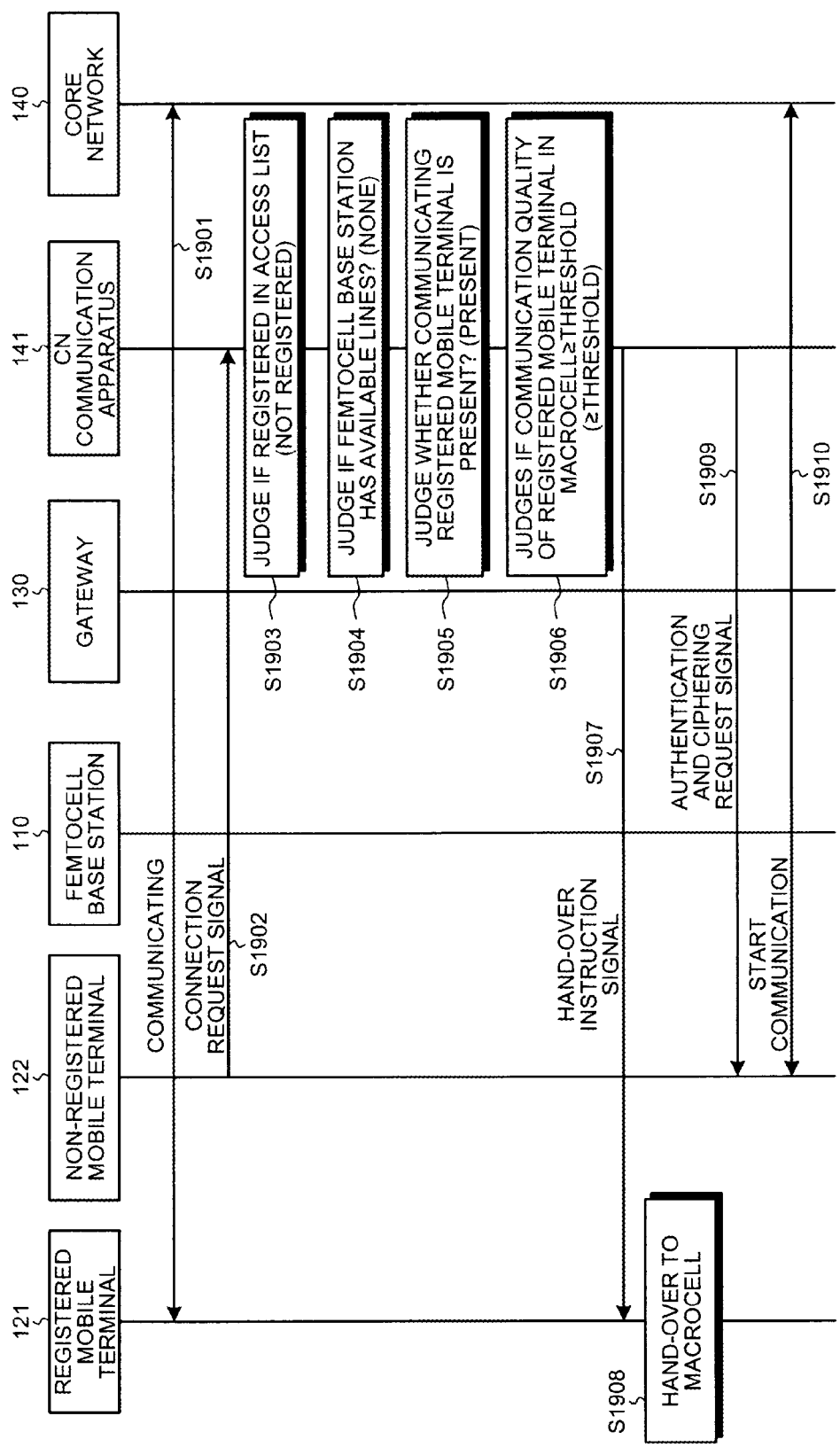

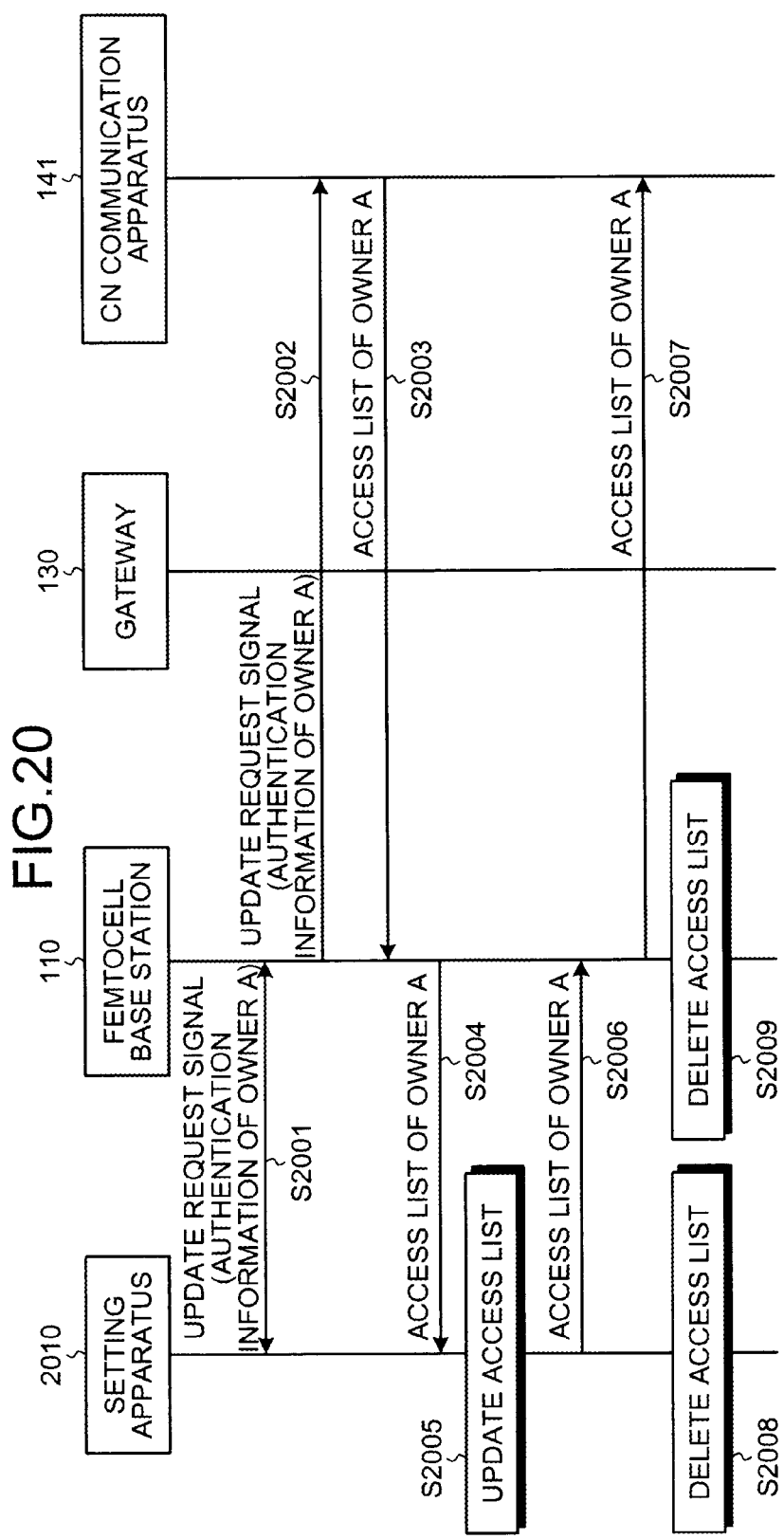

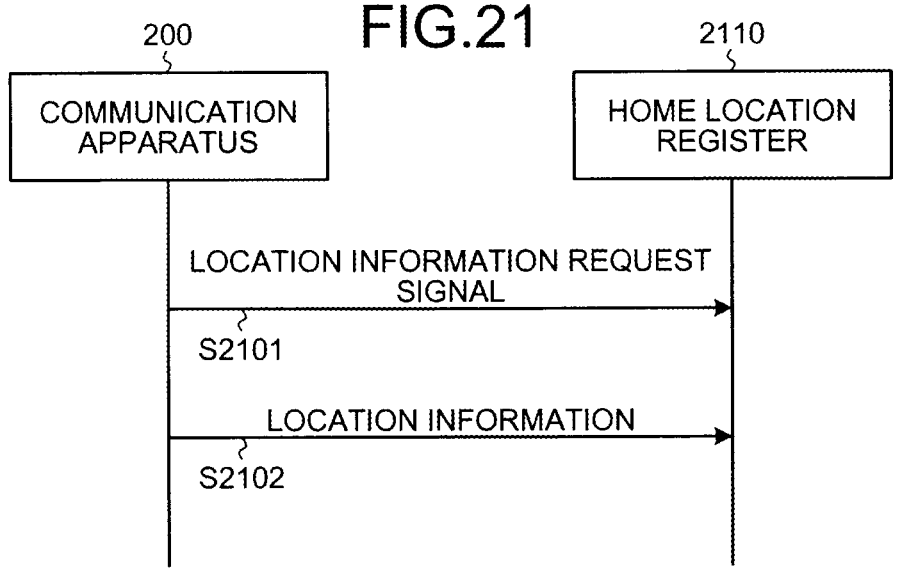

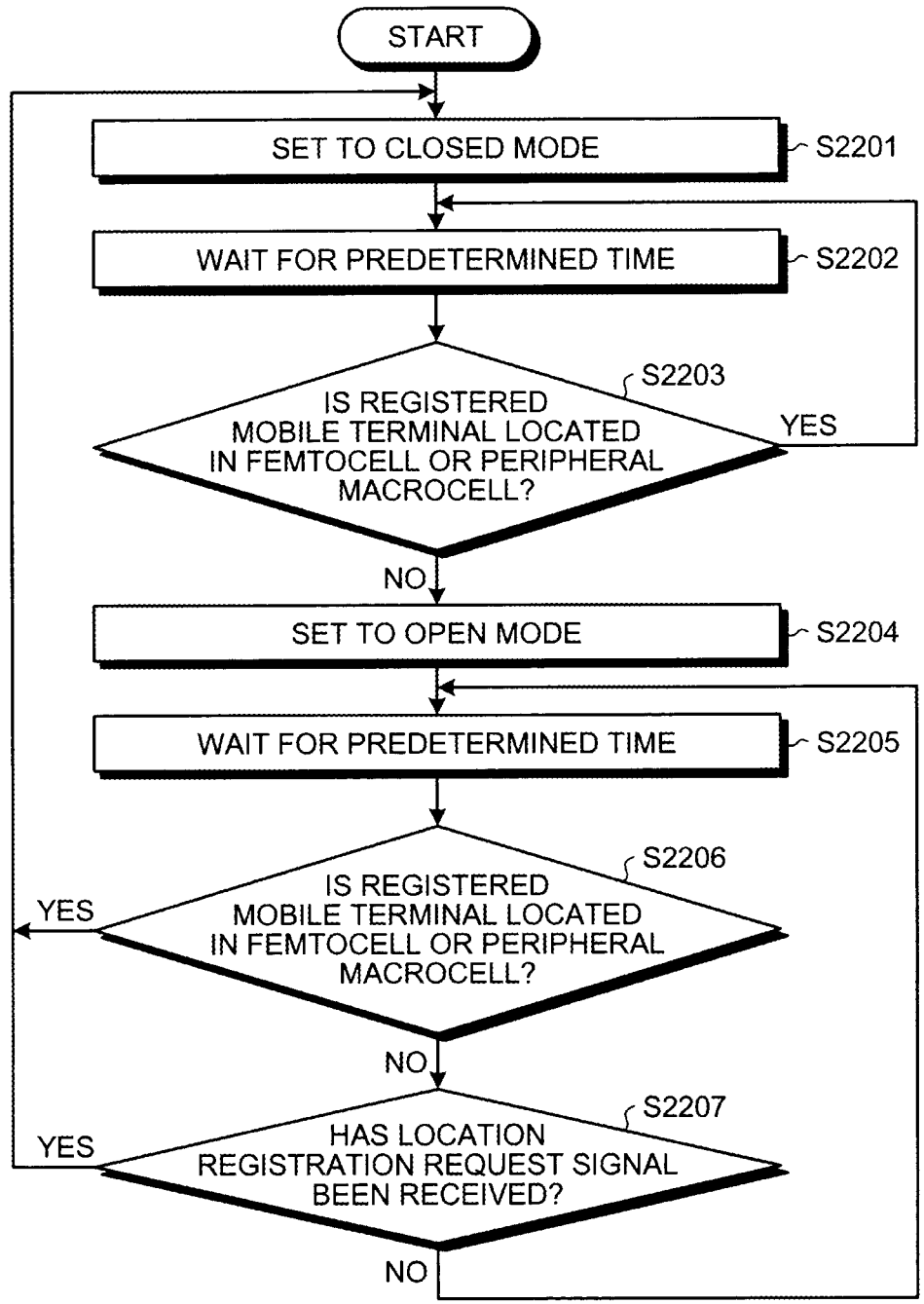

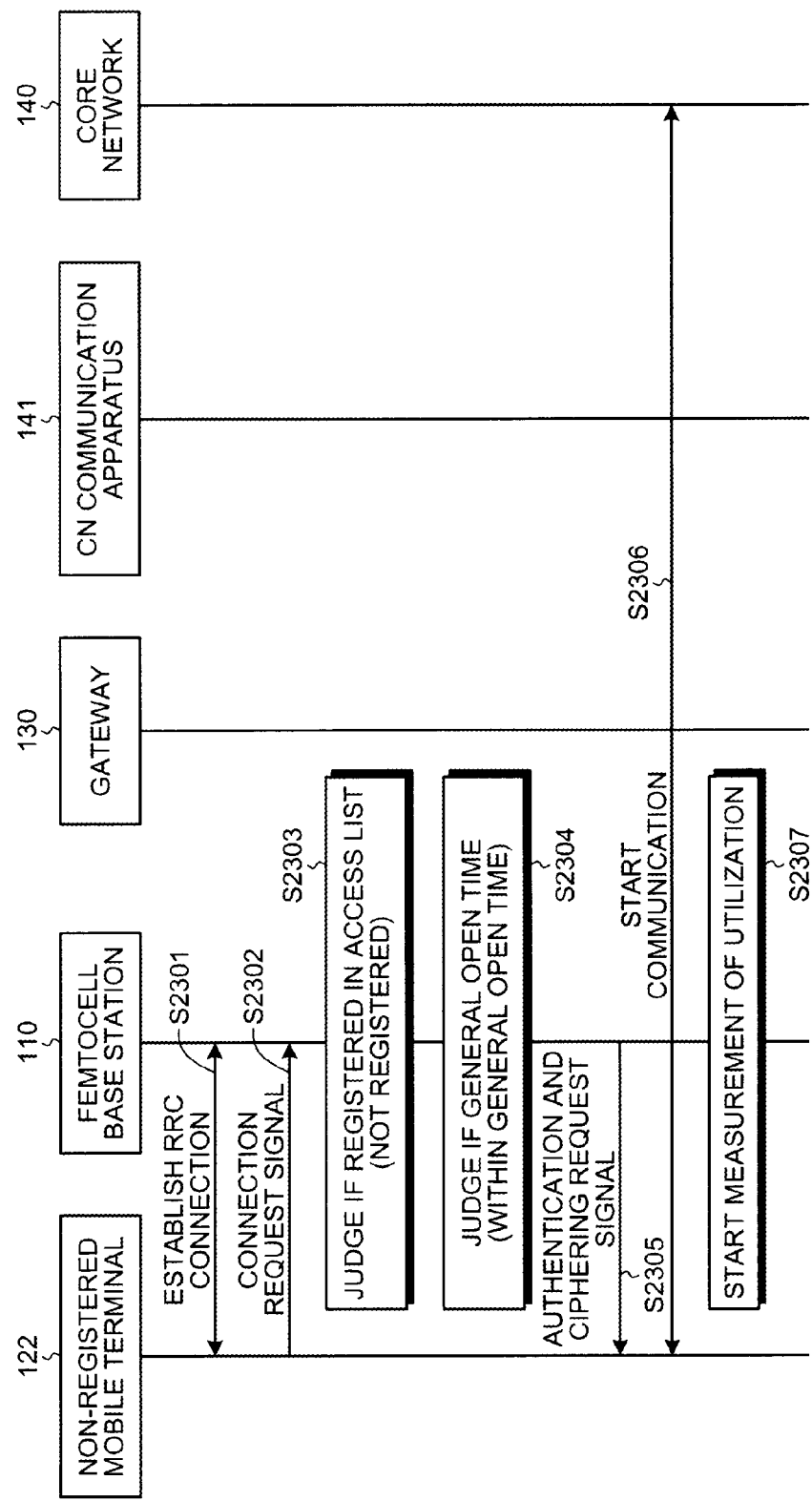

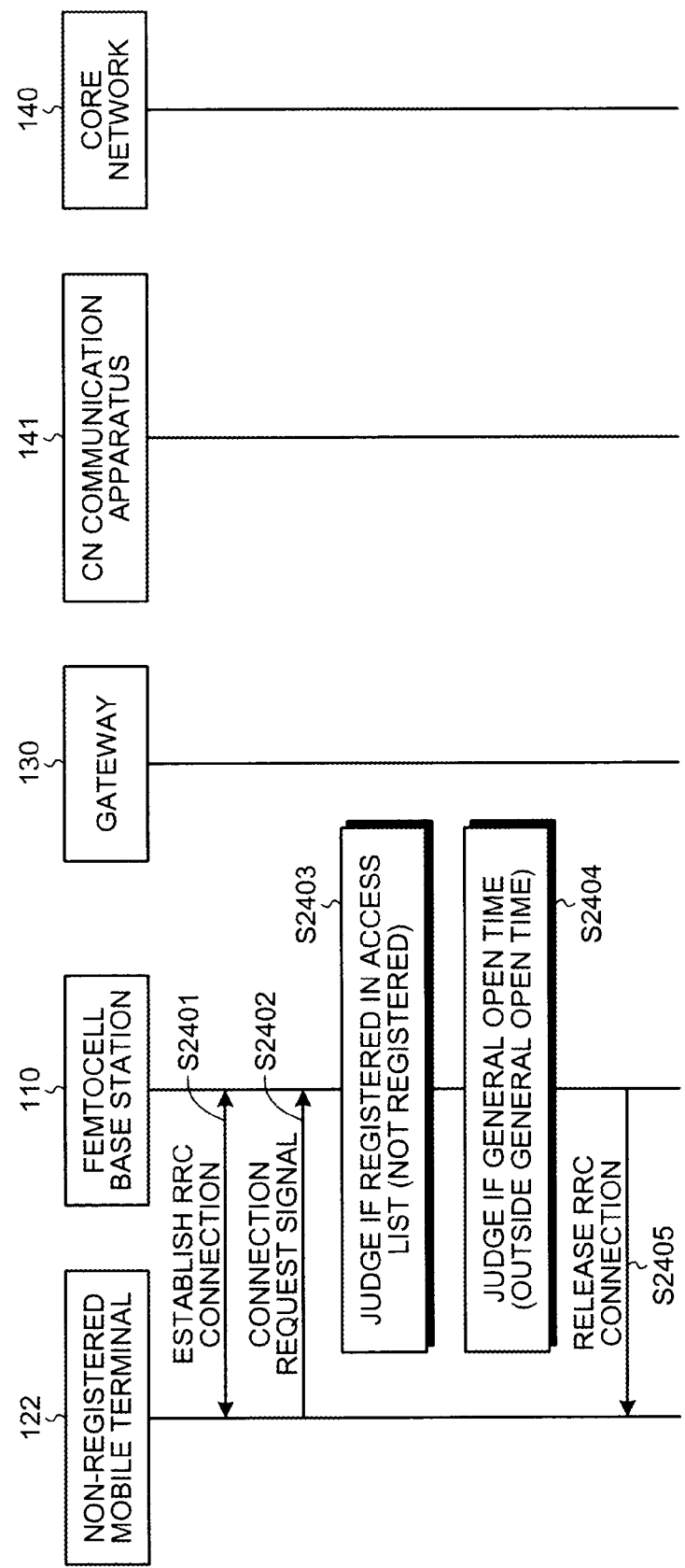

COMMUNICATION APPARATUS, BASE STATION, AND COMMUNICATION METHOD

CROSS REFERENCE TO RELATED APPLICATIONS

This application is a continuation application of International Application PCT/JP2010/054710, filed on Mar. 18, 2010 and designating the U.S., the entire contents of which are incorporated herein by reference.

FIELD

The embodiments discussed herein are related to a communication apparatus, a base station, and a communication method.

BACKGROUND

Recently, in the field of radio communication networks, the introduction of femtocell base stations (femtocell base transceiver stations (BTS)) as a small-type radio base station (BTS) is under study. A femtocell base station is installed, for example, to augment communication areas or services in residential homes, commercial stores, or enterprises. There is a technology of receiving user authentication data, terminal information, and encrypted information, making a location registration request to the femtocell base station based on the received information, and controlling the communication between a mobile terminal and the femtocell base station (see, e.g., Published Japanese-Translation of PCT Application, Publication No. 2005/096656).

The conventional technology described above, however, has a problem in that the spread of femtocell base station use is difficult. Namely, in the introduction of a femtocell base station, the expenses involved (equipment and installation) as well as broadband line usage fees, and electricity expenses are expected to borne not by communication service providers but by the owner of the femtocell base station. Thus, introduction expenses and operation costs of the femtocell base station are thought to put fetters on the widespread use of the femtocell base station.

SUMMARY

According to an aspect of an embodiment, a communication apparatus includes memory that stores registration information that indicates a registered mobile terminal registered in a base station; and a processor configured to perform connection processing of connecting a non-registered mobile terminal to the base station, based on a connection request signal from the non-registered mobile terminal not stored in the memory; measure utilization of the base station by the non-registered mobile terminal for which the connection processing has been performed; and transmit obtained measurement results to another communication apparatus via a communication interface.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 depicts a configuration example of a communication system according to an embodiment;

FIG. 2 depicts the communication apparatus according to the embodiment;

FIG. 3 depicts one example of a general open time for a non-registered mobile terminal;

FIG. 4 depicts one example of the general open time for each registered mobile terminal;

FIG. 7 is a sequence diagram of one example of the setting by the user;

FIG. 8 is a flowchart of one example of processing of determining the number of permitted connections based on a utilization history;

FIG. 11 is a flowchart of one example of the processing of connecting the non-registered mobile terminal;

FIG. 12 is a sequence diagram of an example of processing of permitting the connection of the non-registered mobile terminal;

FIG. 13 is a sequence diagram of an example of processing of rejecting the connection of the non-registered mobile terminal;

FIG. 15 is a flowchart of the first example of the conflict processing by the communication apparatus;

FIG. 16 is a sequence diagram of the first example of the conflict processing by the communication apparatus;

FIG. 18 is a flowchart of the second example of the conflict processing by the communication apparatus;

FIG. 19 is a sequence diagram of the second example of the conflict processing by the communication apparatus;

FIG. 20 is a sequence diagram of a dynamic change of an access list;

FIG. 21 is a sequence diagram of connection permission for the non-registered mobile terminal according to the presence/absence of the registered mobile terminal in the cell;

FIG. 22 is a flowchart of the connection permission of the non-registered mobile terminal according to the presence/absence of the registered mobile terminal in the cell;

FIG. 23 is a sequence diagram of an example of processing of permitting the connection of the non-registered mobile terminal; and FIG. 24 is a sequence diagram of an example of processing of rejecting the connection of the non-registered mobile terminal.

DESCRIPTION OF EMBODIMENTS

Figures 5, 6:
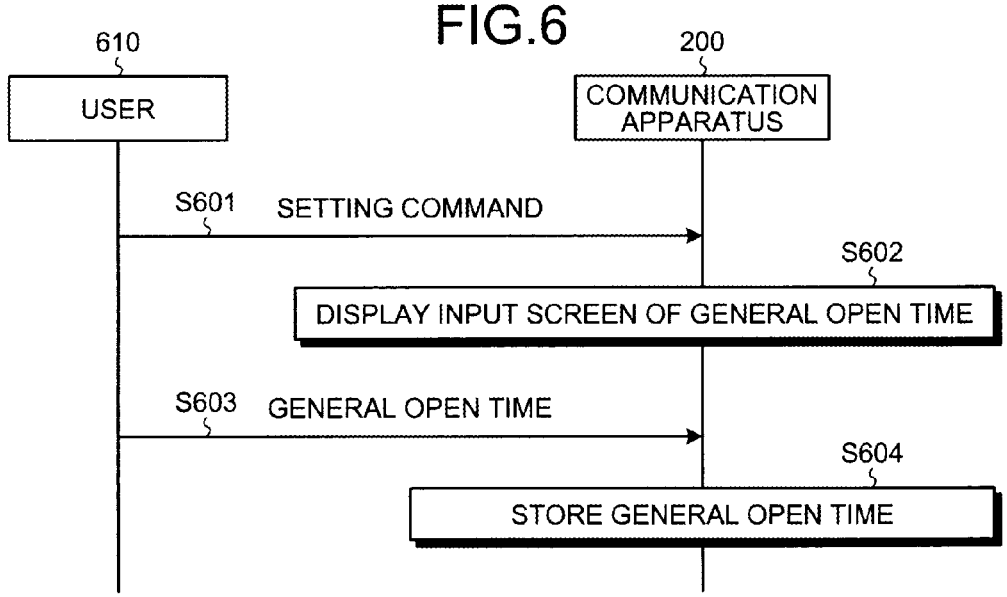
FIG. 5 depicts one example of the number of permitted connections of the non-registered mobile terminal.
FIG. 6 is a sequence diagram of one example of setting by a user.

Preferred embodiments of a communication apparatus, a base station, and a communication method will be explained with reference to the accompanying drawings. The communication apparatus, the base station, and the communication method measure the utilization of a femtocell base station by a non-registered mobile terminal and transmit measurement results, enabling the user to receive a benefit according to the utilization of the femtocell base station by the non-registered mobile terminal and facilitating widespread use of femtocell base stations.

FIG. 1 depicts a configuration example of a communication system according to an embodiment. As depicted in FIG. 1, a communication system 100 according to the embodiment includes a femtocell base station 110, a registered mobile terminal 121, a non-registered mobile terminal 122, a gateway 130, a core network 140, a CN communication apparatus 141, and a provider communication apparatus 142. The femtocell base station 110 and the gateway 130 are disposed, for example, in the same indoor space. Although the femtocell base station 110 is given as an example a base station, another base station may be used in place of the femtocell base station 110.

The femtocell base station 110 forms a femtocell 111 surrounding the femtocell base station 110. The femtocell base station 110 performs radio communication with the registered mobile terminal 121 and the non-registered mobile terminal 122 located in the femtocell 111. The femtocell base station 110 connects to the gateway 130. The femtocell base station 110 relays communication between the registered mobile terminal 121 or the non-registered mobile terminal 122 and the core network 140 by way of the gateway 130.

Upon receipt of a connection request signal (location registration request signal) from the registered mobile terminal 121 or the non-registered mobile terminal 122, the femtocell base station 110 makes an inquiry (determination of contract information) to the CN communication apparatus 141 on the core network 140. Upon receipt of a connection approval signal from the CN-sided communication apparatus 141, the femtocell base station 110 starts to relay the communication between the registered mobile terminal 121 or the non-registered mobile terminal 122 and the core network 140.

The registered mobile terminal 121 and the non-registered mobile terminal 122 are mobile terminals (user equipment (UE)) capable of the radio communication, such as a cellular phone or a mobile information terminal. The registered mobile terminal 121 and the non-registered mobile terminal 122, if located in the femtocell 111, are capable of the radio communication with the femtocell base station 110. The registered mobile terminal 121 and the non-registered mobile terminal 122, if located in a macrocell of a macrocell base station (not depicted), are capable of the radio communication with the macrocell base station.

The registered mobile terminal 121 is a mobile terminal registered on an access list of the femtocell base station 110. The registered mobile terminal 121 is, for example, a mobile terminal of the owner of the femtocell base station 110 or a mobile terminal of a person related to the owner of the femtocell base station 110. The non-registered mobile terminal 122 is a mobile terminal not registered on the access list of the femtocell base station 110. The non-registered mobile terminal 122 is, for example, a mobile terminal of an unspecified person having no particular relationship with the owner of the femtocell base station 110. There may be multiple registered mobile terminals 121 and non-registered mobile terminals 122.

The gateway 130 is a gateway between the femtocell base station 110 and the core network 140. The gateway 130 is, for example, a home nodeB-gateway (HNB-GW) or may be a home enhanced nodeB-gateway (HeNB-GW).

The core network 140 is a backbone network such as the Internet. The CN communication apparatus 141 is a communication apparatus on the core network 140. The provider communication apparatus 142 is a communication apparatus on the core network 140 and is a communication apparatus of the provider controlling the femtocell base station 110.

FIG. 2 depicts the communication apparatus according to the embodiment. As depicted in FIG. 2, a communication apparatus 200 according to the embodiment has a registration information memory unit 210, a connection processing unit 220, a measuring unit 230, and a transmitting unit 240. The communication apparatus 200 may further have condition memory unit 250 and a determining unit 260.

The communication apparatus 200 can be applied, for example, to a communication apparatus capable of communicating with the femtocell base station 110 such as the gateway 130 and the CN communication apparatus 141 depicted in FIG. 1. In the embodiment, a configuration will be described of applying the communication apparatus 200 to the CN communication apparatus 141. The configuration of applying the communication apparatus 200 to the gateway 130, however, can realize the same functions.

The registration information memory unit 210 stores the access list of the femtocell base station 110. The access list is registration information that indicates the registered mobile terminals of the femtocell base station 110. The access list is, for example, a list of identification information of the registered mobile terminals. The identification information of the registered mobile terminals is, for example, the International Mobile Subscriber Identity (IMSI) of each registered mobile terminals. The registered mobile terminal 121 depicted in FIG. 1 is registered in the access list stored in the registration information memory unit 210. The non-registered mobile terminal 122 depicted in FIG. 1 is not registered in the access list stored in the registration information memory unit 210.

The connection processing unit 220, based on the connection request signal from the registered mobile terminal 121 or the non-registered mobile terminal 122, performs processing of connecting the registered mobile terminal 121 or the non-registered mobile terminal 122 to the femtocell base station 110. The connection processing unit 220 acquires the connection request signal from the registered mobile terminal 121 or the non-registered mobile terminal 122, for example, by way of the femtocell base station 110. The connection processing unit 220 notifies the measuring unit 230 of the non-registered mobile terminal 122 for which the processing of connecting to the femtocell base station 110 has been performed.

The measuring unit 230 measures the utilization of the femtocell base station 110 by the non-registered mobile terminal 122 reported by the connection processing unit 220. For example, the utilization of the femtocell base station 110 is the volume of the communication performed by way of the femtocell base station 110. The utilization of the femtocell base station 110 is, for example, the volume of packets or the time of communication. When there are multiple non-registered mobile terminals 122, the utilization of the femtocell base station 110 may be, for example, the number of the non-registered mobile terminals 122 that have performed communication by way of the femtocell base station 110.

The start of the measurement by the measuring unit 230 is triggered, for example, by the start of a call by the non-registered mobile terminal 122 or a hand-over (Hand In) of the non-registered mobile terminal 122 from another cell to the femtocell 111. The end of the measurement by the measuring unit 230 is triggered, for example, by the end of the call by the non-registered mobile terminal 122 or the hand-over (Hand Out) of the non-registered mobile terminal 122 from the femtocell 111 to another cell.

The measuring unit 230, for example, measures the utilization of the femtocell base station 110 based on the information received from the femtocell base station 110 or the gateway 130. The measuring unit 230 outputs results of the measurement to the transmitting unit 240. The measuring unit 230, for example, outputs the measurement results each time the non-registered mobile terminal 122 performs communication by way of the femtocell base station 110 or may store the measurement results and output the stored measurement results collectively at a predetermined timing.

The transmitting unit 240 transmits the measurement results output from the measuring unit 230 to another communication apparatus. The communication apparatus to which the measuring results are sent is, for example, the provider communication apparatus 142. This enables the provider controlling the femtocell base station 110 to acquire the information on the utilization of the femtocell base station 110 by the non-registered mobile terminal 122.

Thus, the communication system 100 makes it possible to permit the connection of the non-registered mobile terminal 122 to the femtocell base station 110 and to measure the utilization of the femtocell base station 110 by the non-registered mobile terminal 122 and transmit the measurement results, thereby enabling the owner of the femtocell base station 110 to receive a benefit according to the utilization of the femtocell base station 110 by the non-registered mobile terminal 122 and facilitating the widespread use of the femtocell base station 110.

For example, transmission of the measurement results to the provider communication apparatus 142 enables the owner of the femtocell base station 110 to receive some benefit from the provider controlling the femtocell base station 110. The benefit may be in the form of a monetary assignment, a discount on usage fees of the femtocell base station 110, etc. . . . . For example, the contribution of the femtocell base station 110 is calculated with respect to the communication of the non-registered mobile terminal 122 by way of the femtocell base station 110 as (volume of packet transmitted)×A+(communication time)×B+(number of non-registered mobile terminals 122)×C and on the benefit is given based on the results of the calculation. A, B, and C are arbitrary coefficients.

The condition memory unit 250 stores conditions for permitting the connection of the non-registered mobile terminal 122 to the femtocell base station 110. The connection processing unit 220 judges whether to perform processing of connecting the non-registered mobile terminal 122 to the femtocell base station 110, for example, based on the conditions stored in the condition memory unit 250. The determining unit 260 determines the conditions for permitting the connection of the non-registered mobile terminal 122 to the femtocell base station 110 and causes the determined conditions to be stored in the condition memory unit 250.

The registration information memory unit 210 and the condition memory unit 250 depicted in FIG. 2 can be realized by a storage device of the communication apparatus 200. The registration information memory unit 210 and the condition memory unit 250 may be realized by the same storage device or may be realized by separate storage devices. The connection processing unit 220, the measuring unit 230, and the transmitting unit 240 can be realized, for example, by a computing device such as a digital signal processor (DSP) and a communication interface.

Setting of the conditions for permitting the connection of the non-registered mobile terminal 122 to the femtocell base station 110 will be described. The setting of the conditions for permitting the connection of the non-registered mobile terminal 122 to the femtocell base station 110 is performed, for example, before the operation of the femtocell base station 110.

FIG. 3 depicts one example of a general open time for the non-registered mobile terminal. The condition memory unit 250 stores, for example, a table 300 depicted in FIG. 3. The table 300 includes a mobile terminal identifier, a femtocell base station number, and the general open time. The mobile terminal identifier is identification information (e.g., IMSI) of the registered mobile terminal 121.

The femtocell base station number is the identification information of the femtocell base unit 110. The general open time is information that indicates an open period during which the connection of the non-registered mobile terminal 122 is permitted. The general open time is, for example, input by a user through an input device (not depicted) of the communication apparatus 200 and stored in the condition memory unit 250. The connection processing unit 220 performs the processing of connecting the non-registered mobile terminal 122 to the femtocell base station 110 during the general open time (9:00 to 18:00). On the other hand, the connection processing unit 220 does not perform the processing of connecting the non-registered mobile terminal 122 to the femtocell base station 110 during a period different from the general open time (18:00 to 9:00 time period).

Thus, a line for the registered mobile terminal 121 can be secured and a situation in which the registered mobile terminal 121 cannot be connected to the femtocell base station 110 during the period outside the general open time can be prevented, whereby convenience for the user of the registered mobile terminal 121 can be maintained. For example, by setting as the general open time, a time period during which the frequency of use of the femtocell base station 110 is low, the user of the registered mobile terminal 121 can let the non-registered mobile terminal 122 use the femtocell base station 110 without sacrificing convenience.

An example of the general open time has been has been given as an open period during which the connection of the non-registered mobile terminal 122 is permitted. However, the open period during which the connection of the non-registered mobile terminal 122 is permitted is not limited to a time period and may be a period on a daily basis (e.g., the same day of the week), a period on a monthly basis, etc., (the same is true for the following description). For example, the general open time may be set as weekdays (Monday to Friday), thereby making it possible to let the non-registered mobile terminal 122 use the femtocell base station 110 on weekdays while securing a line for the registered mobile terminal 121 on holidays.

FIG. 4 depicts one example of the general open time for each of the registered mobile terminals. The storage device of the communication apparatus 200 stores, for example, a table 400 depicted in FIG. 4. In the table 400, the femtocell base station number and the general open time are related to each mobile terminal identifier. The femtocell base station numbers, which are the number of the femtocell base station 110, are the same number. The general open time for each mobile terminal identifier is, for example, input by the user through the input device (not depicted) of the communication apparatus 200 and is stored in the storage device of the communication apparatus 200.

FIG. 5 depicts one example of the number of permitted connections of the non-registered mobile terminal. A table 500 depicted in FIG. 5 represents one example of the number of permitted connections for each time period as determined by the determining unit 260. The determining unit 260 of the communication apparatus 200 determines the number of permitted connections of the non-registered mobile terminal 122 for each time period, based on the general open time for each mobile terminal identifier (see FIG. 4) stored in the storage device of the communication apparatus 200 and the number of maximum simultaneous connections in terms of specification of the femtocell base station 110.

The maximum number of simultaneous connections in terms of specification of the femtocell base station 110, for example, may be pre-stored in the storage device of the communication apparatus 200 or may be obtained by receiving information that indicates the maximum number of simultaneous connections from the femtocell base station 110. For example, the determining unit 260 of the communication apparatus 200 determines the number of permitted connections for each time period by subtracting the number of the registered mobile terminals 121 for which the general open time is not set in the corresponding time period from the number α of maximum simultaneous connections in terms of specification of the femtocell base station 110.

For example, in the 0:00 to 9:00 time period, the general open time is not set in three registered mobile terminals 121 (see FIG. 4). For this reason, the number of permitted connections for the 0:00 to 9:00 time period is "α−3". In the 9:00-15:00 time period, the general open time is not set in one registered mobile terminal 121 (xxxxyyyccc) (see FIG. 4). For this reason, the number of permitted connections for the 9:00 to 15:00 time period is "α−1".

Further, in the 15:00 to 18:00 time period, the general open time is not set in two registered mobile terminals 121 (xxxxyyybbb, xxxxyyyccc) (see FIG. 4). For this reason, the number of permitted connections for the 15:00 to 18:00 time period is "α−2". In the 18:00-24:00 time period, the general open time is not set in three registered mobile terminal 121 (see FIG. 4). For this reason, the number of permitted connections for the 18:00 to 24:00 time period is "α−3".

Thus, the number of permitted connections for each time period can be determined based on the general open time for each registered mobile terminal 121. When the number of the non-registered mobile terminals 122 connected to the femtocell base station 110 has reached the number of permitted connections for the present period, the connection processing unit 220 does not perform the connection processing even if a connection request signal is received from another non-registered mobile terminal 122. When the number of the non-registered mobile terminals 122 connected to the femtocell base station 110 has not yet reached the number of permitted connections for the present period, the connection processing unit 220 performs the connection processing if a connection request signal is received from another non-registered mobile terminal 122.

This makes it possible to secure a line for the registered mobile terminal 121, thereby preventing a situation in which the registered mobile terminal 121 cannot be connected to the femtocell base station 110. For this reason, the convenience of the user of the registered mobile terminal 121 can be maintained. During the time period in which there are a smaller number of the registered mobile terminals 121 using the femtocell 111, a greater number of the non-registered mobile terminals 122 can be permitted to use the femtocell base station 110.

A case has been described where the number of permitted connections for non-registered mobile terminals 122 is determined for each of the time periods, 0:00 to 9:00 time period, the 9:00 to 15:00 time period, the 15:00 to 18:00 time period, and the 18:00 to 24:00 time period into which the time period of one day is divided. A method of dividing the time period, however, is not limited hereto and, for example, the number of permitted connections for a non-registered mobile terminal 122 may be determined for each of the time periods divided by the hour (same is true for the following description).

FIG. 6 is a sequence diagram of one example of setting by the user. A user 610 depicted in FIG. 6 is, for example, the owner of the femtocell base station 110. The user 610 inputs a setting command to the communication apparatus 200 (step S601). The communication apparatus 200 displays for the user 610, an input screen of the general open time (step S602). The user 610 inputs the general open time to the input screen displayed at step S602 (step S603).

The communication apparatus 200 stores the general open time input at step S603 (step S604), finishing a sequence of operations. By the above steps, the general open time (FIG. 3) is stored to the condition memory unit 250 of the communication apparatus 200. At step S603, the general open time may be input for each of the registered mobile terminals 121. In this case, the general open time for each of the registered mobile terminals 121 (see FIG. 4) is stored to the storage device of the communication apparatus 200. After step S604, the communication apparatus 200 determines the number of permitted connections for each time period (see FIG. 5) and stores the number to the condition memory unit 250.

Each of the above steps is performed, for example, by the user 610 directly operating the communication apparatus 200 or may be performed by the user 610 using a setting terminal such as a personal computer to connect to the communication apparatus 200. Each of the above steps is performed, for example, when the power of the femtocell base station 110 is turned on. Each of the above steps, however, is not limited to the timing of turning on the power of the femtocell base station 110 and configuration may be such that each of the above steps can be performed at an arbitrary time by the user 610.

FIG. 7 is a sequence diagram of one example of the setting by the user. The user 610 inputs the setting command to the communication apparatus 200 (step S701). The communication apparatus 200 displays for the user 610, an input screen for the maximum number of simultaneous connections in terms of the specification of the femtocell base station 110 and the number of registrations in the access list of the femtocell base station 110 (step S702). The user 610 inputs, through the input screen displayed at step S702, the maximum number of simultaneous connections in terms of the specification of the femtocell base station 110 and the number of the registrations in the access list of the femtocell base station 110 (step S703).

The communication apparatus 200 determines the number of permitted connections of the non-registered mobile terminal 122, based on the maximum number of simultaneous connections and the number of the registrations in the access list input at step S703 (step S704). The communication apparatus 200, for example, determines the number α−X obtained by subtracting the number X of the registrations in the access list of the femtocell base station 110 from the number α of the maximum simultaneous connections in terms of the specification of the femtocell base station 110 as the number of permitted connections of the non-registered mobile terminal 122.

The communication apparatus 200 stores the number of permitted connections of the non-registered mobile terminal 122 determined at step S704 (step S705), finishing a sequence of operations. Although a case has been described where the number of the registrations in the access list of the femtocell base station 110 is input at step S703, the communication apparatus 200 may automatically acquire the number of the registrations from the access list of the femtocell base station 110.

Consequently, the number of permitted connections of the non-registered mobile terminal 122 is stored to the condition memory unit 250. In this case, when the number of the non-registered mobile terminals 122 connected to the femtocell base station 110 has reached the number of permitted connections irrespective of the present period, the connection processing unit 220 does not perform the connection processing even if a connection request signal is received from another non-registered mobile terminal 122. If the number of the non-registered mobile terminals 122 connected to the femtocell base station 110 has not yet reached the number of permitted connections, the connection processing unit 220 performs the connection processing when a connection request signal is received from another non-registered mobile terminal 122.

FIG. 8 is a flowchart of one example of processing of determining the number of permitted connections based on a utilization history. The communication apparatus 200 executes, for example, the following steps. The communication apparatus 200 sets a timer to time a predetermined period (one week, one month, or three months, etc.) (step S801) and acquires the number of connections of the registered mobile terminal 121 to the femtocell base station 110 (step S802).

The communication apparatus 200 judges if the timer set at step S801 has reached the set time (step S803). If the timer has not yet reached the set time (step S803: NO), the communication apparatus 200 returns to step S802. If the timer has reached the set time (step S803: YES), the communication apparatus 200 determines the number of permitted connections of the non-registered mobile terminal 122 for each time period, based on the number of the connections acquired at step S802 (step S804) and returns to step S801.

At step S804, the communication apparatus 200 calculates an average value for each hour, the number of the connections of the registered mobile terminal 121 to the femtocell base station 110, based on the number of connections acquired at step S802. The communication apparatus 200 determines the number of permitted connections of the non-registered mobile terminal 122 for each time period, based on the calculated average value for each hour.

The number of permitted connections of the non-registered mobile terminal 122 for each time period before the performance of the above steps, for example, is set at the number obtained by subtracting the number of the registered mobile terminals 121 from the maximum number of simultaneous connections in terms of the specification of the femtocell base station 110, thereby making it possible to surely secure a line for the registered mobile terminal 121 before the performance of the above steps.

Figures 9, 10:
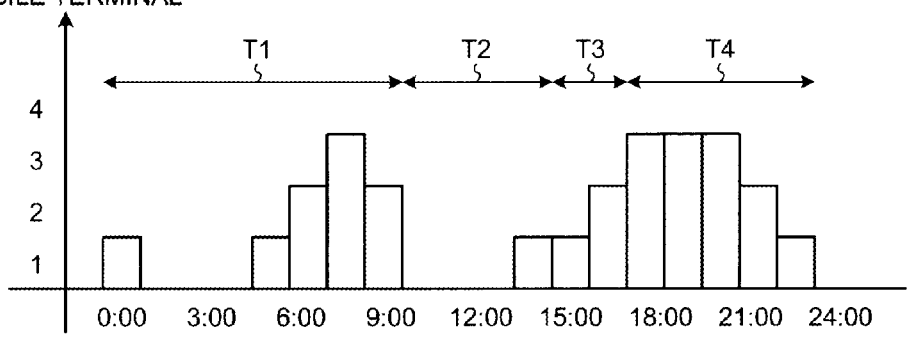
FIG. 9 is a graph of one example of the utilization history of the registered mobile terminal.
FIG. 10 depicts one example of the number of permitted connections of the non-registered mobile terminal.

FIG. 9 is a graph of one example of the utilization history of the registered mobile terminal. In FIG. 9, the horizontal axis represents time; the vertical axis represents the number of the connections of the registered mobile terminal 121 to the femtocell base station 110. FIG. 9 depicts for each hour, the average value (utilization history) of the number of the connections of the registered mobile terminal 121 to the femtocell base station 110 calculated at step S802 depicted in FIG. 8.

FIG. 10 depicts one example of the number of permitted connections of the non-registered mobile terminal. A table 1000 depicted in FIG. 10 indicates the number of permitted connections of the non-registered mobile terminal 122 determined by the communication apparatus 200 based on the utilization history of the femtocell base station 110 by the registered mobile terminal 121 depicted in FIG. 9. The number $\alpha$ of the maximum simultaneous connections in terms of the specification of the femtocell base station 110 is given as $\alpha=4$.

For example, in the 0:00 to 9:00 time period (period T1), the number of the connections of the registered mobile terminal 121 to the femtocell base station 110 is 3 at maximum. Accordingly, the number of permitted connections of the non-registered mobile terminal 122 in the 0:00 to 9:00 time period is 1, obtained by subtracting 3 from the number $\alpha$ (=4) of the maximum simultaneous connections in terms of the specification of the femtocell base station 110.

In the 9:00 to 15:00 time period (period T2), the number of the connections of the registered mobile terminal 121 to the femtocell base station 110 is 1 at maximum. Accordingly, the number of permitted connections of the non-registered mobile terminal 122 in the 9:00 to 15:00 time period is 3, obtained by subtracting 1 from the number $\alpha$ (=4) of the maximum simultaneous connections in terms of the specification of the femtocell base station 110.

In the 15:00 to 18:00 time period (period T3), the number of the connections of the registered mobile terminal 121 to the femtocell base station 110 is 2 at maximum. Accordingly, the number of permitted connections of the non-registered mobile terminal 122 in the 15:00 to 18:00 time period is 2, obtained by subtracting 2 from the number $\alpha$ (=4) of the maximum simultaneous connections in terms of the specification of the femtocell base station 110.

In the 18:00 to 24:00 time period (period T4), the number of the connections of the registered mobile terminal 121 to the femtocell base station 110 is 3 at maximum. Accordingly, the number of permitted connections of the non-registered mobile terminal 122 in the 18:00 to 24:00 time period is 1, obtained by subtracting 3 from the number $\alpha$ (=4) of the maximum simultaneous connections in terms of the specification of the femtocell base station 110.

Thus, the communication system 100 may acquire history information that indicates the utilization history of the femtocell base station 110 for each of the registered mobile terminals 121 and determine the number of permitted connections of the non-registered mobile terminal 122 for each period based on the history information of each of the registered mobile terminals 121, thereby making it possible to automatically determine the number of permitted connections of the non-registered mobile terminal 122 for each period according to the utilization of the femtocell base station 110 by the registered mobile terminals 121.

FIG. 11 is a flowchart of one example of the processing of connecting the non-registered mobile terminal. The communication apparatus 200 executes, for example, the following steps as processing of connecting the non-registered mobile terminal 122. The communication apparatus 200 judges if a connection request signal has been received (step S1101) and wait until a connection request signal is received (step S1101: NO).

When the connection request signal has been received at step S1101 (step S1101: YES), the communication apparatus 200 judges if the originator of the received connection request signal is the registered mobile terminal 121 (step S1102). If the originator is the registered mobile terminal 121 (step S1102: YES), the communication apparatus 200 performs the processing of connecting the registered mobile terminal 121 to the femtocell base station 110 (step S1103), finishing a sequence of operations.

At step S1102, if the originator of the received connection request signal is the non-registered mobile terminal 122 (step S1102: NO), the communication apparatus 200 judges if the current time is during the general open time (see, e.g., FIG. 3) (step S1104). If the current time is not during the general open time (step S1104: NO), the communication apparatus 200 performs the processing of rejecting the connection of the non-registered mobile terminal 122 (step S1105), finishing a sequence of operations.

At step S1104, if the current time is during the general open time (step S1104: YES), the communication apparatus 200 performs the processing of connecting the non-registered mobile terminal 122 to the femtocell base station 110 (step S1106) and measures the utilization of the femtocell base station 110 by the non-registered mobile terminal 122 for which the connection processing has been performed at step S1106 (step S1107). The communication apparatus 200 stores results of the measurement at step S1107 (step S1108), finishing a sequence of operations.

The above steps make it possible to perform the processing of connecting the non-registered mobile terminal 122 to the femtocell base station 110 during the general open time and to not perform the processing of connecting the non-registered mobile terminal 122 during periods other than the general open time. Utilization of the femtocell base station 110 by the non-registered mobile terminal 122 when the processing has been performed of connecting the non-registered mobile terminal 122 to the femtocell base station 110 can be measured and stored. The communication apparatus 200 transmits the stored measurement results to another communication apparatus at predetermined timing.

FIG. 12 is a sequence diagram of an example of processing of permitting the connection of the non-registered mobile terminal. The non-registered mobile terminal 122 establishes a Radio Resource Control Connection (RRC) connection with the femtocell base station 110 (step S1201). The non-registered mobile terminal 122 then transmits a connection request signal (LU REQUEST) (step S1202). The connection request signal transmitted at step S1202 is transmitted to the CN communication apparatus 141 by way of the femtocell base station 110 and the gateway 130.

The CN communication apparatus 141 judges if the non-registered mobile terminal 122 is registered in the access list of the femtocell base station 110 (step S1203). In this example, the CN communication apparatus 141 judges that the non-registered mobile terminal 122 is not registered in the access list of the femtocell base station 110 (NOT REGISTERED).

The CN communication apparatus 141 judges if the current time is during the general open time (see, e.g., FIG. 3) (step S1204). Here, a case will be described in which the current time is during the general open time (WITHIN GENERAL OPEN TIME). The CN communication apparatus 141 transmits an authentication and ciphering request signal (step S1205). The authentication and ciphering request signal is transmitted to the non-registered mobile terminal 122 by way of the gateway 130 and the femtocell base station 110.

The non-registered mobile terminal 122 starts communication with the core network 140 (step S1206). The CN communication apparatus 141 starts the measurement of the utilization of the femtocell base station 110 by the non-registered mobile terminal 122 (step S1207), finishing a sequence of operations. At step S1207, the CN communication apparatus 141 starts the measurement of communication volume of the communication started at step S1206.

Although a case has been described where the non-registered mobile terminal 122 starts the communication with the core network 140 at step S1206, the communication counterpart of the non-registered mobile terminal 122 communicates is not limited to the core network 140. The communication counterpart of the non-registered mobile terminal 122 may be, for example, another communication apparatus within the same LAN as the gateway 130.

FIG. 13 is a sequence diagram of an example of processing of rejecting the connection of the non-registered mobile terminal. Operations at steps S1301 to S1304 depicted in FIG. 13 are identical to those at steps S1201 to S1204 depicted in FIG. 12 and description thereof is omitted. At step S1403, however, a case will be described in which it is judged that the current time is not during the general open time (OUTSIDE GENERAL OPEN TIME).

In this case, after step S1304, the CN communication apparatus 141 transmits a call releasing command (step S1305). The call releasing command transmitted at step S1305 is transmitted to the femtocell base station 110 by way of the gateway 130. The femtocell base station 110 releases the RRC connection established with the non-registered mobile terminal 122 at step S1301 (step S1306), finishing a sequence of operations.

Conflict processing when the femtocell base station 110 has no available line (number $\alpha$ of maximum simultaneous connections−number of connections at present) and a connection request signal is transmitted from the registered mobile terminal 121 or the non-registered mobile terminal 122 will be described.

FIGS. 14A, 14B, 14C, and 14D depict a first example of the conflict processing by the communication apparatus. In FIGS. 14A to 14D, a macrocell base station 1401 is a macrocell base station located in the vicinity of the femtocell base station 110. The macrocell base station 1401 forms a macrocell 1402 surrounding the macrocell base station 1401. The macrocell base station 1401 performs radio communication with a mobile terminal (e.g., registered mobile terminal 121 and non-registered mobile terminal 122) located in the macrocell 1402.

Figure 14A:
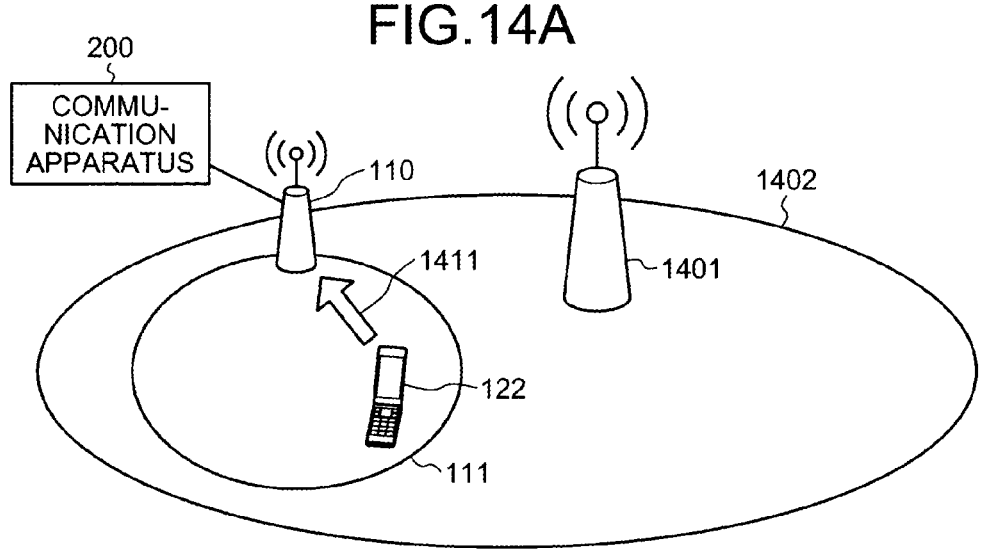
FIGS. 14A, 14B, 14C, and 14D depict a first example of conflict processing by the communication apparatus.
Figure 14B:
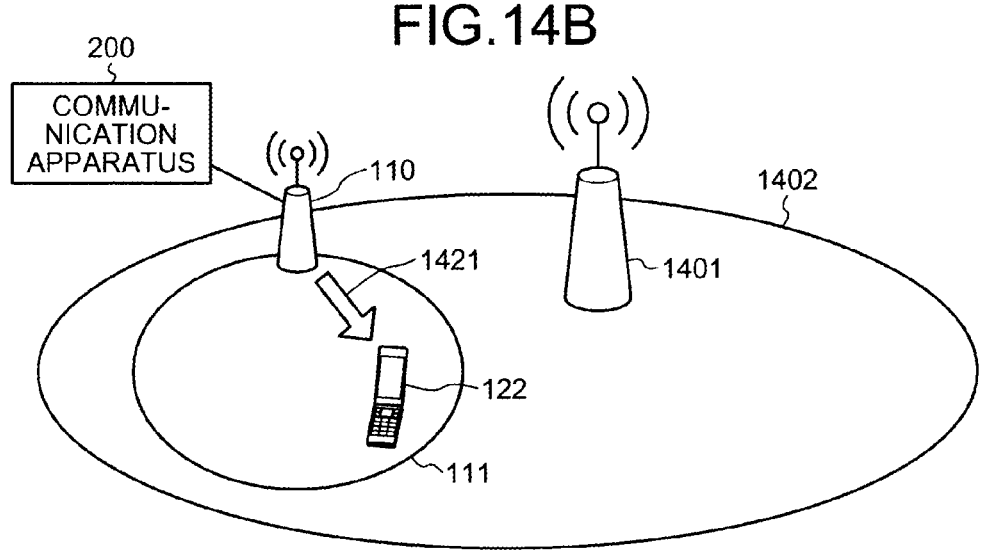

As depicted in FIG. 14A, the non-registered mobile terminal 122 is assumed to enter the femtocell 111 and transmit a connection request signal to the communication apparatus 200 by way of the femtocell base station 110 (reference numeral 1411). Then, as depicted in FIG. 14B, the communication apparatus 200, by way of the femtocell base station 110, is assumed to permit the connection of the non-registered mobile terminal 122 (reference numeral 1421).

Figure 14C:
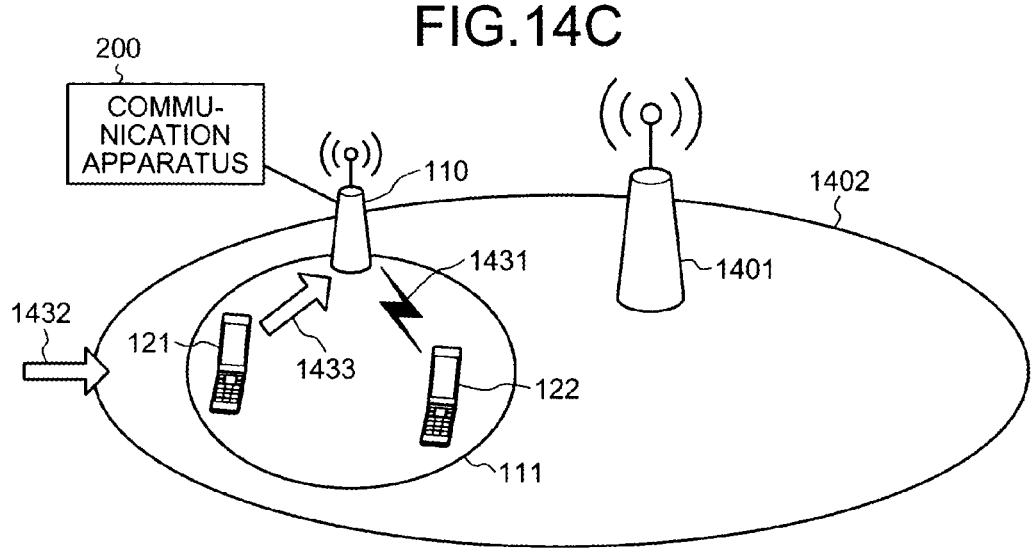

Consequently, as depicted in FIG. 14C, the non-registered mobile terminal 122 is a state of communication with the femtocell base station 110 (reference numeral 1431). In this state, the registered mobile terminal 121 is assumed to enter the femtocell 111 of the femtocell base station 110 (reference numeral 1432) and transmit a connection request signal to the communication apparatus 200, by way of the femtocell base station 110 (reference numeral 1433). In this case, the femtocell base station 110 is assumed to have no available line.

Figure 14D:
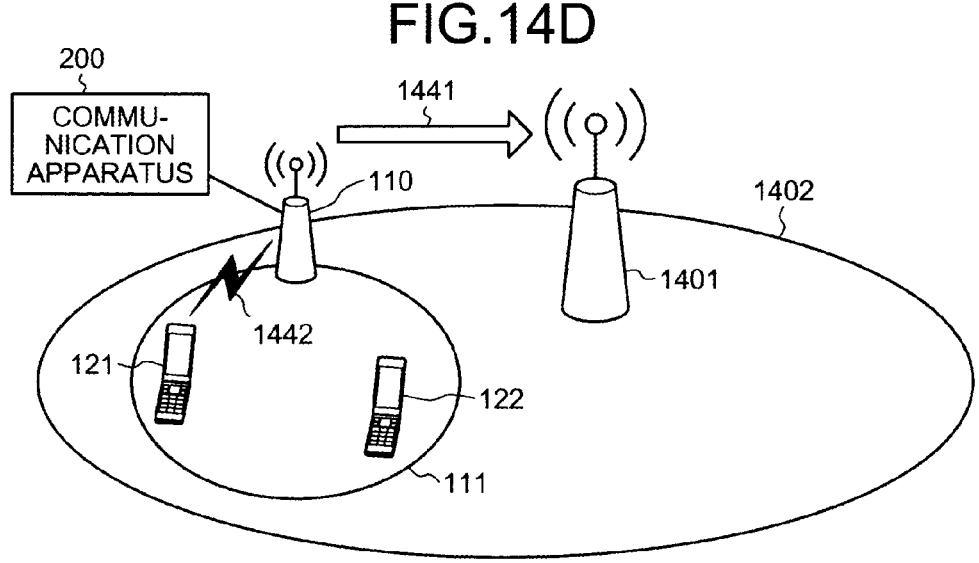

Here, as depicted in FIG. 14D, the communication apparatus 200 causes the non-registered mobile terminal 122 communicating with the femtocell base station 110 to perform hand-over to the macrocell base station 1401 (reference numeral 1441). The communication apparatus 200 performs the processing of connecting the registered mobile terminal 121 to the femtocell base station 110, whereby the registered mobile terminal 121 enters a state of communication with the femtocell base station 110 (reference numeral 1442).

Thus, when the femtocell base station 110 has no available line at the time of reception of the connection request signal from the registered mobile terminal 121, the communication apparatus 200 forcibly causes the non-registered mobile terminal 122 communicating with the femtocell base station 110 to perform hand-over to the macrocell base station 1401. The communication apparatus 200 then performs the processing of connecting the registered mobile terminal 121 to the femtocell base station 110.

This makes it possible to secure a line for the registered mobile terminal 121, thereby preventing a situation in which the registered mobile terminal 121 cannot be connected to the femtocell base station 110. For this reason, the convenience of the user of the registered mobile terminal 121 can be maintained.

FIG. 15 is a flowchart of the first example of the conflict processing by the communication apparatus. The communication apparatus 200 executes, for example, the following steps as the conflict processing of the registered mobile terminal 121 and the non-registered mobile terminal 122. The communication apparatus 200 judges if a connection request signal has been received (step S1501), and waits until a connection request signal is received (step S1501: NO).

At step S1501, when the connection request signal is received (step S1501: YES), the communication apparatus 200 judges if the originator of the received connection request signal is the registered mobile terminal 121 (step S1502). If the originator is the registered mobile terminal 121 (step S1502: YES), the communication apparatus 200 judges if the femtocell base station 110 has any available lines (number α of maximum simultaneous connections−number of connections at present) (step S1503).

At step S1503, if the femtocell base station 110 has an available line (step S1503: YES), the communication apparatus 200 performs the processing of connecting the registered mobile terminal 121 to the femtocell base station 110 (step S1504), finishing a sequence of operations. If the femtocell base station 110 has no available lines (step S1503: NO), the communication apparatus 200 judges if there is the non-registered mobile terminal 122 communicating with the femtocell base station 110 (step S1505).

At step S1505, if there is no non-registered mobile terminal 122 communicating with the femtocell base station 110 (step S1505: NO), the communication apparatus 200 performs the processing of rejecting the connection of the registered mobile terminal 121 (step S1506), finishing a sequence of operations. If a non-registered mobile terminal 122 is communicating with the femtocell base station 110 (step S1505: YES), the communication apparatus 200 causes the non-registered mobile terminal 122 communicating with the femtocell base station 110 to perform hand-over to the macrocell base station 1401 (step S1507), and transitions to step S1504.

At step S1502, if the originator of the connection request signal is the non-registered mobile terminal 122 (step S1502: NO), the communication apparatus 200 transitions to step S1508. The operations at steps S1508 to S1512 depicted in FIG. 15 are identical to those at steps S1104 to S1108 depicted in FIG. 11 and description thereof is omitted.

The above operations make it possible to forcibly cause the non-registered mobile terminal 122 communicating with the femtocell base station 110 to perform hand-over to the macrocell base station 1401.

FIG. 16 is a sequence diagram of the first example of the conflict processing by the communication apparatus. The non-registered mobile terminal 122 is assumed to be communicating with the core network 140 by way of the femtocell base station 110 (step S1601). The registered mobile terminal 121 transmits the connection request signal (LU REQUEST) (step S1602). The connection request signal transmitted at step S1602 is transmitted to the CN communication apparatus 141 by way of the femtocell base station 110 and the gateway 130.

The CN communication apparatus 141 judges if the registered mobile terminal 121 is registered in the access list of the femtocell base station 110 (step S1603). In this example, the registered mobile terminal 121 is assumed to be registered in the access list of the femtocell base station 110 (REGISTERED). The CN communication apparatus then judges if the femtocell base station 110 has any available lines (step S1604). A case will be described in which it is judged that the femtocell base station 110 has no available lines (NO AVAILABLE LINES).

The CN communication apparatus 141 judges whether a non-registered mobile terminal 122 is communicating with the femtocell base station 110 (step S1605). In this example, a non-registered mobile terminal 122 is judged to be communicating with the femtocell base station 110 (PRESENT). The CN communication apparatus 141 then transmits a hand-over instruction signal (RELOCATION) (step S1606). The hand-over instruction signal is transmitted to the non-registered mobile terminal 122 by way of the gateway 130 and the femtocell base station 110.

The non-registered mobile terminal 122 performs hand-over from the femtocell base station 110 to the macrocell base station 1401 (step S1607). The CN communication apparatus 141 transmits an authentication and ciphering request signal (step S1608). The authentication and ciphering request signal is transmitted to the registered mobile terminal 121 by way of the gateway 130 and the femtocell base station 110. The registered mobile terminal 121 starts communication with the core network 140 by way of the femtocell base station 110 (step S1609), finishing a sequence of operations.

Figure 17A:
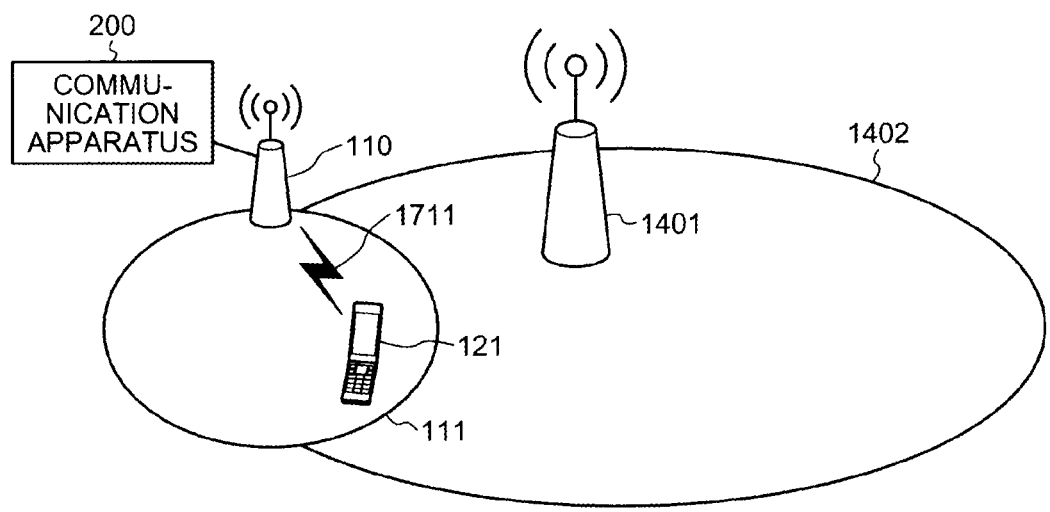
FIGS. 17A, 17B, 17C, and 17D depict a second example of the conflict processing by the communication apparatus.

FIGS. 17A to 17D depict a second example of the conflict processing by the communication apparatus. In FIGS. 17A to 17D, a same part as depicted in FIGS. 14A to 14D has the description thereof omitted, with same reference numeral given. Firstly, as depicted in FIG. 17A, suppose that the registered mobile terminal 121 is communicating by way of the femtocell base station 110 (reference numeral 1711).

Figure 17B:
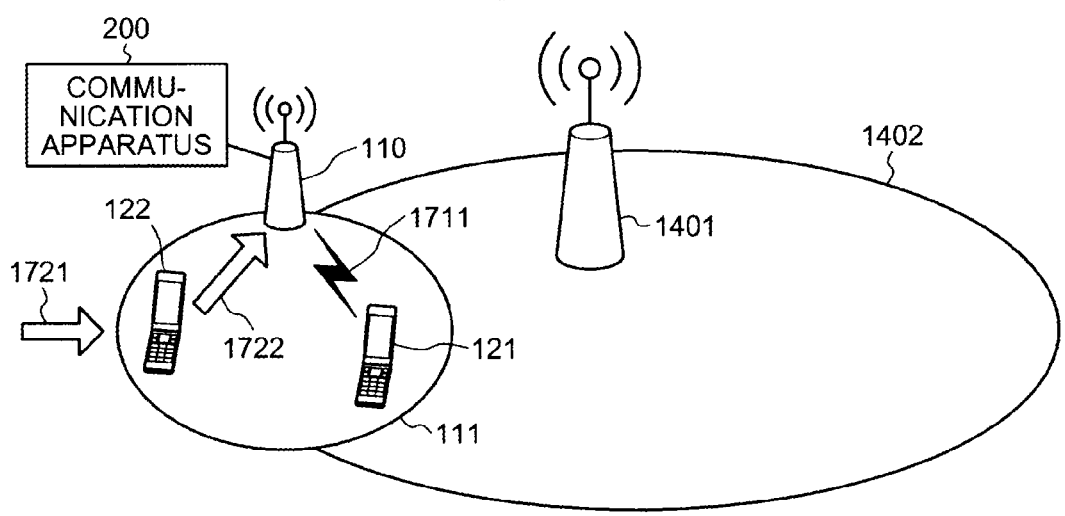

As depicted in FIG. 17B, the non-registered mobile terminal 122 enters the femtocell 111 of the femtocell base station 110 (reference numeral 1721) and transmits a connection request signal to the communication apparatus 200 by way of the femtocell base station 110 (reference numeral 1722). The femtocell base station 110 is assumed to have no available lines (number α of maximum simultaneous connections−number of connections at present).

Figure 17C:
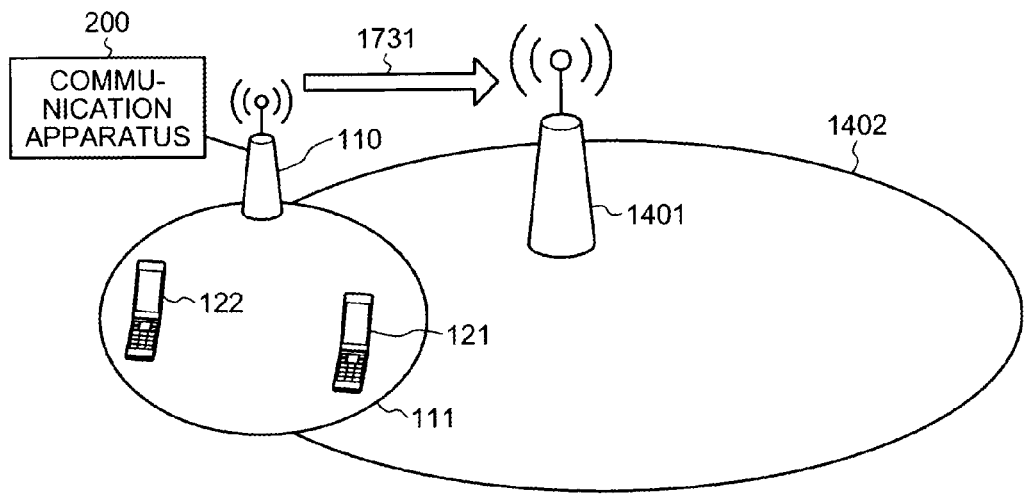

In this case, as depicted in FIG. 17C, the communication apparatus 200 causes the registered mobile terminal 121 communicating with the femtocell base station 110 to perform hand-over to the macrocell base station 1401 (reference numeral 1731). The communication apparatus 200 then performs the processing of connecting the non-registered mobile terminal 122 to the femtocell base station 110.

Figure 17D:
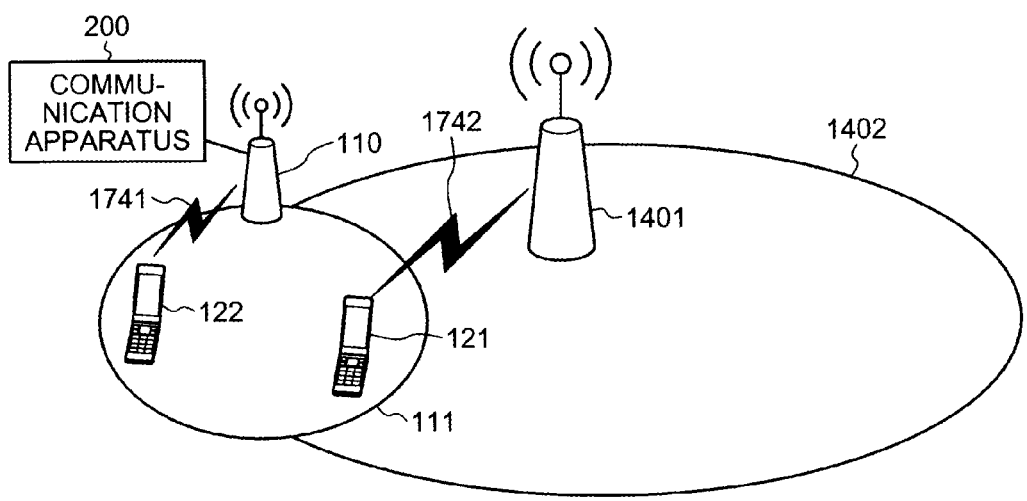

The non-registered mobile terminal enters a state of communicating with the femtocell base station 110, as depicted in FIG. 17D (reference numeral 1741). The registered mobile terminal 121 enters a state of communicating with the macrocell base station 1401 (reference numeral 1742).

Thus, when the femtocell base station 110 has no available lines at the time of reception of the connection request signal from the non-registered mobile terminal 122, the communication apparatus 200 forcibly causes the registered mobile terminal 121 communicating with the femtocell base station 110 to perform hand-over to the macrocell base station 1401. The communication apparatus then performs the processing of connecting the non-registered mobile terminal 122 to the femtocell base station 110.

This enables the non-registered mobile terminal 122 to perform communication using the femtocell base station 110, for example, when the non-registered mobile terminal 122 cannot perform the communication with sufficient quality in the macrocell 1402. Thus, convenience can be improved for the user of the non-registered mobile terminal 122. With the non-registered mobile terminal 122 permitted to use the femtocell base station 110, the benefits received by the user of the registered mobile terminal 121 can be increased.

The communication apparatus 200, by a quality acquiring unit not depicted, may acquire communication quality of the registered mobile terminal 121 in the macrocell 1402 (effective communication area of macrocell base station 1401). The communication apparatus 200 may be configured to not cause the registered mobile terminal 121 to perform hand-over when the acquired communication quality is below a threshold. In this case, the communication apparatus 200 performs the processing of rejecting the connection of the non-registered mobile terminal 122, thereby making it possible to avoid dropping below the threshold of the communication quality of the registered mobile terminal 121 forcibly caused to perform hand-over.

The communication quality of the registered mobile terminal 121 in the macrocell 1402 is, for example, propagation quality between the macrocell base station 1401 and the registered mobile terminal 121. The quality acquiring unit of the communication apparatus 200, for example, receives information that indicates the communication quality of the registered mobile terminal 121 in the macrocell 1402 from the registered mobile terminal 121 or the macrocell base station 1401.

FIG. 18 is a flowchart of the second example of the conflict processing by the communication apparatus. The communication apparatus 200 executes, for example, the following steps as the conflict processing of the registered mobile terminal 121 and the non-registered mobile terminal 122. The communication apparatus 200 judges if a connection request signal has been received (step S1801), and waits until a connection request signal is received (step S1801: NO).

At step S1801, when the connection request signal is received (step S1801: YES), the communication apparatus 200 judges if the originator of the received connection request signal is the non-registered mobile terminal 122 (step S1802). If the originator of the received connection request signal is the registered mobile terminal 121 (step S1802: NO), the communication apparatus 200 performs the processing of connecting the registered mobile terminal 121 (step S1803), finishing a sequence of operations.

At step S1802, if the originator of the received connection request signal is the non-registered mobile terminal 122 (step S1802: YES), the communication apparatus 200 judges if the femtocell base station 110 has any available lines (number α of maximum simultaneous connections−number of connections at present) (step S1804). If the femtocell base station 110 has an available line (step S1804: YES), the communication apparatus 200 transitions to step S1808. If the femtocell base station 110 has no available lines (step S1804: NO), the communication apparatus 200 judges if a registered mobile terminal 121 is communicating with the femtocell base station 110 (step S1805).

At step S1805, if there is no registered mobile terminal 121 communicating with the femtocell base station 110 (step S1805: NO), the communication apparatus 200 transitions to step S1809. If there is a registered mobile terminal 121 communicating with the femtocell base station 110 (step S1805: YES), the communication apparatus 200 judges if the communication quality of the registered mobile terminal 121 in the macrocell 1402 is at least equal to the threshold (step S1806).

At step S1806, if the communication quality of the registered mobile terminal 121 in the macrocell 1402 is below the threshold (step S1806: NO), the communication apparatus 200 transitions to step S1809. If the communication quality of the registered mobile terminal 121 in the macrocell 1402 is greater than or equal to the threshold (step S1806: YES), the communication apparatus 200 causes the registered mobile terminal 121 to perform hand-over to the macrocell base station 1401 (step S1807).

Operations at steps S1808 to S1812 depicted in FIG. 18 are identical to the operations at steps S1104 to S1108 depicted in FIG. 11 and description thereof is omitted. The above operations make it possible to forcibly cause the registered mobile terminal 1121 communicating with the femtocell base station 110 to perform hand-over to the macrocell base station 1401 when the femtocell base station 110 has no available lines. The processing of connecting the non-registered mobile terminal 122 to the femtocell base station 110 also becomes possible. It is also made possible to not cause the registered mobile terminal 121 to perform the hand-over when the communication quality of the registered mobile terminal 121 in the macrocell 1402 is below the threshold.

FIG. 19 is a sequence diagram of the second example of the conflict processing by the communication apparatus. The registered mobile terminal 121 is assumed to be communicating with the core network 140 by way of the femtocell base station 110 (step S1901). The registered mobile terminal 121 transmits the connection request signal (LU REQUEST) (step S1902). The connection request signal transmitted at step S1902 is transmitted to the CN communication apparatus 141 by way of the femtocell base station 110 and the gateway 130.

The CN communication apparatus 141 judges if the non-registered mobile terminal 122 is registered in the access list of the femtocell base station 110 (step S1903). In this example, the non-registered mobile terminal 122 is assumed to be judged to not be registered in the access list of the femtocell base station 110 (NOT REGISTERED). The CN communication apparatus then judges if the femtocell base station 110 has any available lines (step S1904). A case will be described in which it is judged that the femtocell base station 110 has no available lines (NO AVAILABLE LINES).

The CN communication apparatus 141 judges whether a registered mobile terminal 121 is communicating with the femtocell base station 110 (step S1905). In this example, a registered mobile terminal 121 is judged to be communicating with the femtocell base station 110 (PRESENT). The CN communication apparatus 141 then judges if the communication quality of the registered mobile terminal 121 in the macrocell 1402 is at least equal to the threshold (step S1906). The case will now be described in which it is judged that the communication quality of the registered mobile terminal 121 is greater than or equal to the threshold (≥THRESHOLD).

The CN communication apparatus 141 then transmits a hand-over instruction signal (RELOCATION) (step S1907). The hand-over instruction signal is transmitted to the registered mobile terminal 121 by way of the gateway 130 and the femtocell base station 110. The registered mobile terminal 121 performs hand-over from the femtocell base station 110 to the macrocell base station 1401 (step S1908).

The CN communication apparatus 141 transmits an authentication and ciphering request signal (step S1909). The authentication and ciphering request signal is transmitted to the non-registered mobile terminal 122 by way of the gateway 130 and the femtocell base station 110. The non-registered mobile terminal 122 starts communication with the core network 140 by way of the femtocell base station 110 (step S1910), finishing a sequence of operations.

FIG. 20 is a sequence diagram of a dynamic change of the access list. A setting terminal 2010 of owner A of the femtocell base station 110 transmits to the femtocell base station 110, a signal to request updating of the access list of the femtocell base station 110 (step S2001). The updating request signal includes authentication information of the owner A of the femtocell base station 110. The authentication information of the owner A is, for example, a combination of an ID and a password.

The femtocell base station 110 transmits to the CN communication apparatus 141, the updating request signal transmitted from the setting terminal 2010 at step S2001 (step S2002). The CN communication apparatus 141 transmits the access list of the owner A (femtocell base station 110) to the femtocell base station 110 (step S2003). The femtocell base station 110 transmits to the setting terminal 2010, the access list transmitted from the CN communication apparatus 141 at step S2003 (step S2004).

The setting terminal 2010 updates the access list transmitted at step S2004 (step S2005). Updating of the access list is performed, for example, by an operation of the owner A. The setting terminal 2010 transmits the access list updated at step S2005 to the femtocell base station 110 (step S2006).

The femtocell base station 110 transmits to the CN communication apparatus 141, the access list transmitted from the setting terminal 2010 at step S2006 (step S2007). The CN communication apparatus 141 newly stores the access list transmitted at step S2007 as the access list of the owner A.

The setting terminal 2010 deletes the access list transmitted at step S2006 from the storage device (step S2008). The femtocell base station 110 deletes the access list transmitted at step S2007 from the storage device (step S2009), finishing a sequence of operations. Thus, configuration may be such that the access list of the femtocell base station 110 can be changed at any time by the owner of the femtocell base station 110.

In response to the updating request signal from the owner of the femtocell base station 110, authentication is performed and only the access list of the owner of the femtocell base station 110 is transmitted to the setting terminal 2010 for updating, thereby making it possible to avoid leakage of the access list of other users, improving the security.

FIG. 21 is a sequence diagram of connection permission for the non-registered mobile terminal according to the presence/absence of the registered mobile terminal in the cell. A home location register (HLR) 2110 depicted in FIG. 21 is a communication apparatus disposed in the core network 140 to control location registration information of the CN communication apparatus 141. The communication apparatus 200 transmits to the home location register 2110, a location information request signal requesting the location information that indicates whether the registered mobile terminal 121 is located in a peripheral macrocell of the femtocell base station 110 (step S2101). The peripheral macrocell of the femtocell base station 110 is a location registration area to which the femtocell base station 110 belongs.

The home location register 2110 transmits to the communication apparatus 200, the location information of the registered mobile terminal 121 (step S2102). Performing the above steps periodically (e.g., every one second, 10 seconds, or 100 seconds) enables the communication apparatus 200 to periodically acquire the location information of the registered mobile terminal 121. The communication apparatus 200, by, for example, making an inquiry to the femtocell base station 110, can acquire the location information that indicates whether the registered mobile terminal 121 is located in the femtocell 111.

The communication apparatus 200 switches between an open mode and a closed mode depending on the location information of the registered mobile terminal 121 (see FIG. 22). In the open mode, the communication apparatus 200 performs the processing of connecting the non-registered mobile terminal 122 to the femtocell base station 110 when the connection request signal is received from the non-registered mobile terminal 122. On the other hand, in the closed mode, the communication apparatus 200 does not perform the connection processing even if the connection request signal is received from the non-registered mobile terminal 122.

FIG. 22 is a flowchart of the connection permission of the non-registered mobile terminal according to the presence/absence of the registered mobile terminal in the cell. The communication apparatus 200 executes the following steps. The communication apparatus 200 sets the mode to the closed mode as the initial state (step S2201) and waits for a predetermined time (step S2202). The communication apparatus 200 judges if the registered mobile terminal 121 is located in the femtocell 111 or the peripheral macrocell (location registration cell) (step S2203).

At step S2203, if the registered mobile terminal 121 is located in the femtocell 111 or the peripheral macrocell (step S2203: YES), the communication apparatus 200 returns to step S2202. In this case, the communication apparatus 200 remains in the closed mode. If the registered mobile terminal 121 is not located in the femtocell 111 or the peripheral macrocell (step S2203: NO), the communication apparatus 200 sets the mode to the open mode (step S2204).

The communication apparatus 200 waits for a predetermined time (step S2205) and judges if the registered mobile terminal 121 is located in the femtocell 111 or the peripheral macrocell (step S2206). If the registered mobile terminal 121 is located in the femtocell 111 or the peripheral macrocell (step S2206: YES), the communication apparatus 200 returns to step S2201. If the registered mobile terminal 121 is not located in the femtocell 111 or the peripheral macrocell (step S2206: NO), the communication apparatus 200 judges if a location registration request signal (connection request signal) has been received from the registered mobile terminal 121 (step S2207).

At step S2207, if a location registration request signal (connection request signal) has been received (step S2207: YES), the communication apparatus 200 returns to step S2201. If the location registration request signal (connection request signal) has not been received (step S2207: NO), the communication apparatus 200 returns to step S2205. The above operations make it possible not to perform the connection processing when the registered mobile terminal 121 is located in the femtocell 111 or the peripheral macrocell.

Thus, the communication apparatus 200 acquires location information that indicates whether the registered mobile terminal 121 is in the femtocell 111 of the femtocell base station 110. If the registered mobile terminal 121 is not located in the femtocell 111, the communication apparatus 200 performs the processing of connecting the non-registered mobile terminal 122 to the femtocell base station 110. On the other hand, if the registered mobile terminal 121 is located in the femtocell 111, the communication apparatus 200 does not perform the connection processing.

The communication apparatus 200 acquires location information that indicates whether the registered mobile terminal 121 is in the peripheral macrocell (location registration area) of the femtocell base station 110. If the registered mobile terminal 121 is not located in the peripheral macrocell, the communication apparatus 200 performs the processing of connecting the non-registered mobile terminal 122 to the femtocell base station 110. On the other hand, if the registered mobile terminal 121 is located in the peripheral macrocell, the communication apparatus 200 does not perform the connection processing.

This makes it possible to secure a line for the registered mobile terminal 121 when the registered mobile terminal 121 is likely to connect to the femtocell base station 110. On the other hand, it is made possible to let the non-registered mobile terminal 122 use the femtocell base station 110 when the registered mobile terminal 121 is unlikely to connect to the femtocell base station 110.

The condition memory unit 250 of the communication apparatus 200 may store information indicating a rejectable mobile terminal for which the connection to the femtocell base station 110 is rejected. The connection processing unit 220 does not perform the connection processing despite the reception of the connection request signal, with respect to the rejectable mobile terminal indicated by the information stored in the condition memory unit 250. Thus, a mobile terminal constantly occupying resources and identified as a rejectable mobile terminal, can be prevented from being connected.

A case where the communication apparatus 200 is applied to the femtocell base station 110 will be described.

FIG. 23 is a sequence diagram of an example of processing of permitting the connection of the non-registered mobile terminal. The non-registered mobile terminal 122 establishes RRC connection with the femtocell base station 110 (step S2301). The non-registered mobile terminal 122 transmits a connection request signal (LU REQUEST) to the femtocell base station 110 (step S2302).

The femtocell base station 110 judges if the non-registered mobile terminal 122 is registered in the access list of the femtocell base station 110 (step S2303). In this example, the femtocell base station 110 judges that the non-registered mobile terminal 122 is not registered in the access list of the femtocell base station 110 (NOT REGISTERED).

The femtocell base station 110 judges if the current time is during the general open time (see, e.g., FIG. 3) (step S2304). A case will be described in which the current time is during the general open time (WITHIN GENERAL OPEN TIME). The femtocell base station 110 transmits an authentication and ciphering request signal (Authentication and Ciphering Request) to the non-registered mobile terminal 122 (step S2305).

The non-registered mobile terminal 122 starts communication with the core network 140 (step S2306). The femtocell base station 110 starts the measurement of the utilization of the femtocell base station 110 by the non-registered mobile terminal 122 (step S2307), finishing a sequence of operations. At step S2307, the femtocell base station 110 starts the measurement of the communication volume of the communication started at step S2306.

Although a case where the non-registered mobile terminal 122 starts communicating with the core network 140 has been described, the communication counterpart of the non-registered mobile terminal 122 is not limited to the core network 140. The communication counterpart of the non-registered mobile terminal 122 may be, for example, another communication apparatus within the same LAN as the gateway 130.

FIG. 24 is a sequence diagram of an example of processing of rejecting the connection of the non-registered mobile terminal. Operations at steps S2401 to S2404 depicted in FIG. 24 are identical to those at steps S2301 to S2304 depicted in FIG. 23 and description thereof is omitted. At step S2404, however, a case in which it is judged that the current time is not during the general open time (OUTSIDE GENERAL OPEN TIME) will be described.

In this case, after step S2404, the femtocell base station 110 releases the RRC connection established with the non-registered mobile terminal 122 at step S2401 (step S2405), finishing a sequence of operations. As depicted in FIGS. 23 and 24, when the communication apparatus 200 is applied to the femtocell base station 110, the connection processing is performed directly between the non-registered mobile terminal 122 and the femtocell base station 110.

In other respects, the function of the communication apparatus 200 when applied to the femtocell base station 110 is the same as that of the communication apparatus 200 when applied to the CN communication apparatus 141 or the gateway 130.

Thus, the communication apparatus 200 according to the embodiment makes it possible to permit the connection of the non-registered mobile terminal 122 to the femtocell base station 110 and to measure the utilization of the femtocell base station 110 by the non-registered mobile terminal 122 and transmit the measurement results. Thus, the owner of the femtocell base station 110 can receive a benefit according to the utilization of the femtocell base station 110 by the non-registered mobile terminal 122 and a widespread use of the femtocell base station 110 can be facilitated.

This makes it possible to reduce the burden on the user who installs the femtocell base station 110 and achieve the widespread use of the femtocell base station 110. By permitting the connection of the non-registered mobile terminal 122 to the femtocell base station 110, the convenience can be enhanced of the user of the non-registered mobile terminal 122. The area that cannot be covered by the macrocell of the macrocell base station can be efficiently augmented by achieving the widespread use of the femtocell base station 110.

In the above embodiment, a configuration has been described of measuring the utilization of the femtocell base station 110 by the non-registered mobile terminal 122 among various mobile terminals and not measuring the utilization of the femtocell base station 110 by the registered mobile terminal 121.

In contrast, the embodiment may be configured to measure the utilization of the femtocell base station 110 by the registered mobile terminal 121 and the non-registered mobile terminal 122. In this case, the communication apparatus 200 transmits the measurement results of the non-registered mobile terminal 122 among the measurement results of the registered mobile terminal 121 and the non-registered mobile terminal 122, or transmits the measurement results of the non-registered mobile terminal 122 as distinguished from the measurement results of the registered mobile terminal 121. This makes it possible for the owner of the femtocell base station 110 to receive a benefit according to the utilization of the femtocell base station 110 by the non-registered mobile terminal 122.

As described above, according to the communication apparatus, the base station, and the communication method, the widespread use of the femtocell base station can be facilitated.

According to the disclosed communication apparatus, base station, and communication method, widespread use of the femtocell base station can be achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising:
a memory that stores registration information that indicates a registered mobile terminal registered in a base station; and
a processor configured to:
perform connection processing of connecting a non-registered mobile terminal to the base station, based on a connection request signal from the non-registered mobile terminal not stored in the memory,
measure utilization of the base station by the non-registered mobile terminal for which the connection processing has been performed, and
transmit obtained measurement results to another communication apparatus via a communication interface
wherein
the memory stores the number of permitted connections of the non-registered mobile terminal, and
the processor does not perform the connection processing when the number of the non-registered mobile terminals connected to the base station has reached the number of permitted connections indicated in the memory.

2. The communication apparatus according to claim 1, wherein
the other communication apparatus is a communication apparatus of a provider controlling the base station.

3. The communication apparatus according to claim 1, wherein
the memory stores an open period during which connection of the non-registered mobile terminal is permitted, and
the processor does not perform the connection processing during a period different from the open period stored indicted in the memory.

4. The communication apparatus according to claim 1, wherein
the memory stores the number of permitted connections for each period, and
the processor does not perform the connection processing when the number of the non-registered mobile terminals connected to the base station has reached the number of permitted connections corresponding to the present period, among the numbers of the permitted connections.

5. The communication apparatus according to claim 4, further comprising:
an input device that inputs an open period during which the connection of the non-registered mobile terminal is permitted, for each of the registered mobile terminals, wherein
the processor is further configured to determine the number of permitted connections for the each period based on the open period of each of the registered mobile terminals input by the input device, and
the memory stores the number of permitted connections determined for the each period.

6. The communication apparatus according to claim 4, wherein
the processor is further configured to:
acquire history information that indicates a utilization history of the base station by the registered mobile terminal for each of the registered mobile terminals, and
determine the number of permitted connections for the each period based on the history information of each of the registered mobile terminals acquired by the history acquiring unit, and
the memory stores the number of permitted connections determined for the each period.

7. The communication apparatus according to claim 1, wherein
the processor causes the non-registered mobile terminal communicating with the base station to perform hand-over to the other base station and performs connection processing of connecting the registered mobile terminal to the base station, when the base station has no available line.

8. The communication apparatus according to claim 1, wherein
the processor causes the registered mobile terminal communicating with the base station to perform hand-over to the other base station and performs connection processing of connecting the non-registered mobile terminal to the base station, when the base station has no available line.

9. The communication apparatus according to claim 8, wherein
the processor is further configured to acquire communication quality of the registered mobile terminal in an effective communication area of the other base station, and causes the registered mobile terminal to perform the hand-over to the other base station when the acquired communication quality is at least a threshold.

10. The communication apparatus according to claim 1, wherein
the processor is further configured to acquire location information that indicates whether the registered mobile terminal is located within an effective communication area of the base station and does not perform the connection processing when the registered mobile terminal is located in the effective communication area, based on the acquired location information.

11. The communication apparatus according to claim 1, wherein
the processor is further configured to acquire location information that indicates whether the registered mobile terminal is located within a location registration area of the base station and does not perform the connection processing when the registered mobile terminal is located in the location registration area, based on the acquired location information.

12. The communication apparatus according to claim 1, wherein
the memory stores a rejectable mobile terminal for which connection to the base station is rejected, and
the processor does not perform the connection processing with respect to the rejectable mobile terminal indicated in the memory.

13. A base station comprising:
a memory that stores registration information that indicates a registered mobile terminal of the base station;
a processor configured to:
perform connection processing of connecting a non-registered mobile terminal to the base station, based on a connection request signal from a non-registered mobile terminal not indicated by the information stored in the memory,
measure utilization of the base station by the non-registered mobile terminal for which the connection processing has been performed, and
transmit obtained measurement results to another communication apparatus
wherein memory stores the number of permitted connections of the non-registered mobile terminal, and the processor does not perform the connection processing when the number of the non-registered mobile terminals connected to the base station has reached the number of permitted connections indicated in the memory.

14. A communication method comprising:

storing in a memory, registration information that indicates a registered mobile terminal registered in a base station;

performing by a processor, connection processing of connecting a non-registered mobile terminal to the base station, based on a connection request signal from the non-registered mobile terminal not stored in the memory;

measuring by the processor, utilization of the base station by the non-registered mobile terminal for which the connection processing has been performed; and transmitting by the processor, obtained measurement results to another communication apparatus via a communication interface wherein the memory stores the number of permitted connections of the non-registered mobile terminal, and the processor does not perform the connection processing when the number of the non-registered mobile terminals connected to the base station has reached the number of permitted connections indicated in the memory.

* * * * *